(12) United States Patent
Chadzelek et al.

(10) Patent No.: US 9,749,387 B2
(45) Date of Patent: Aug. 29, 2017

(54) TRANSPARENTLY STATEFUL EXECUTION OF STATELESS APPLICATIONS

(75) Inventors: Thomas Chadzelek, St. Ingbert (DE); Jens C. Ittel, Limburgerhof (DE)

(73) Assignee: SAP SE, Walldorf (DE)

( * ) Notice: Subject to any disclaimer, the term of this patent is extended or adjusted under 35 U.S.C. 154(b) by 1791 days.

(21) Appl. No.: 12/540,973

(22) Filed: Aug. 13, 2009

(65) Prior Publication Data

US 2011/0040826 A1    Feb. 17, 2011

(51) Int. Cl.
*G06F 15/16* (2006.01)
*H04L 29/08* (2006.01)

(52) U.S. Cl.
CPC ............ *H04L 67/02* (2013.01); *H04L 67/142* (2013.01)

(58) Field of Classification Search
CPC ... H04L 67/02; H04L 67/142; H04N 21/8173; H04N 7/17318; G06F 9/505
USPC ....... 709/245, 230, 228, 227, 224, 223, 218, 709/236, 207, 206, 238, 220, 203, 215, 709/201, 247; 719/331, 328, 330, 316, 719/311; 370/410, 401, 395.52, 355, 328, 370/256, 255, 252; 726/23
See application file for complete search history.

(56) References Cited

U.S. PATENT DOCUMENTS

| | | | |
|---|---|---|---|
| 7,228,525 B2 | 6/2007 | Chadzelek | |
| 7,350,213 B2 * | 3/2008 | Deutesfeld et al. | 719/316 |
| 7,409,692 B2 | 8/2008 | Ittel et al. | |
| 7,434,203 B2 | 10/2008 | Stienhans et al. | |
| 7,461,382 B2 | 12/2008 | Hammerich et al. | |
| 7,543,268 B2 | 6/2009 | Cherdron et al. | |
| 7,546,314 B1 | 6/2009 | Lakner et al. | |
| 7,562,347 B2 | 7/2009 | Baumgart et al. | |
| 7,881,215 B1 * | 2/2011 | Daigle et al. | 370/252 |

(Continued)

FOREIGN PATENT DOCUMENTS

| | | | | |
|---|---|---|---|---|
| DE | EP 1388782 A1 * | 2/2004 | ....... | G06F 17/30884 |
| EP | 1388782 A1 * | 2/2004 | | |
| WO | WO01/54378 A2 | 7/2001 | | |

OTHER PUBLICATIONS

European Search Report and Search Opinion issued in International Application No. 10008381.5-2211, Dec. 10, 2010, 8 pages.

(Continued)

*Primary Examiner* — Kamal Divecha
*Assistant Examiner* — Charles Murphy
(74) *Attorney, Agent, or Firm* — Fish & Richardson P.C.

(57) ABSTRACT

This disclosure provides various embodiments for providing transparently stateful execution of stateless applications. A request associated with an application is received and includes at least one operation to be executed by the application as well as a set of first state information. The application determines if the operations are to be executed statelessly or not. If the application is to be executed statelessly, the first state information is retrieved from the request and used to initialize the application. If not, then the first state of the application is retrieved from a location other than the received request. The operations are then executed by the application in the application's appropriate first state. A response including the relevant information associated with the response as well as an updated set of state information identifying the application's second state is generated and transmitted to the client.

19 Claims, 11 Drawing Sheets

(56) References Cited

U.S. PATENT DOCUMENTS

| | | | |
|---|---|---|---|
| 2003/0182235 A1* | 9/2003 | Wang et al. | 705/51 |
| 2005/0154887 A1* | 7/2005 | Birk | G06F 21/41 |
| | | | 713/168 |
| 2006/0075088 A1 | 4/2006 | Guo et al. | |
| 2006/0187901 A1* | 8/2006 | Cortes | H04L 29/06027 |
| | | | 370/352 |
| 2007/0240100 A1 | 10/2007 | Hammerich et al. | |
| 2008/0155457 A1 | 6/2008 | Ittel | |
| 2008/0294937 A1* | 11/2008 | Ueda | G06F 9/4856 |
| | | | 714/15 |
| 2009/0006539 A1* | 1/2009 | Degenkolb et al. | 709/203 |
| 2009/0198820 A1* | 8/2009 | Golla et al. | 709/228 |
| 2011/0282939 A1* | 11/2011 | Golla et al. | 709/203 |

OTHER PUBLICATIONS

Letizi, Orion, "Stateful Web Applications that Scale Like Stateless Ones, Beware of the State Monster," *Dr. Dobb's Journal*, Jun. 11, 2008 [online], <http://www.ddj.com/architect/208403462>, retrieved Aug. 13, 2009, 5 pages.

\* cited by examiner

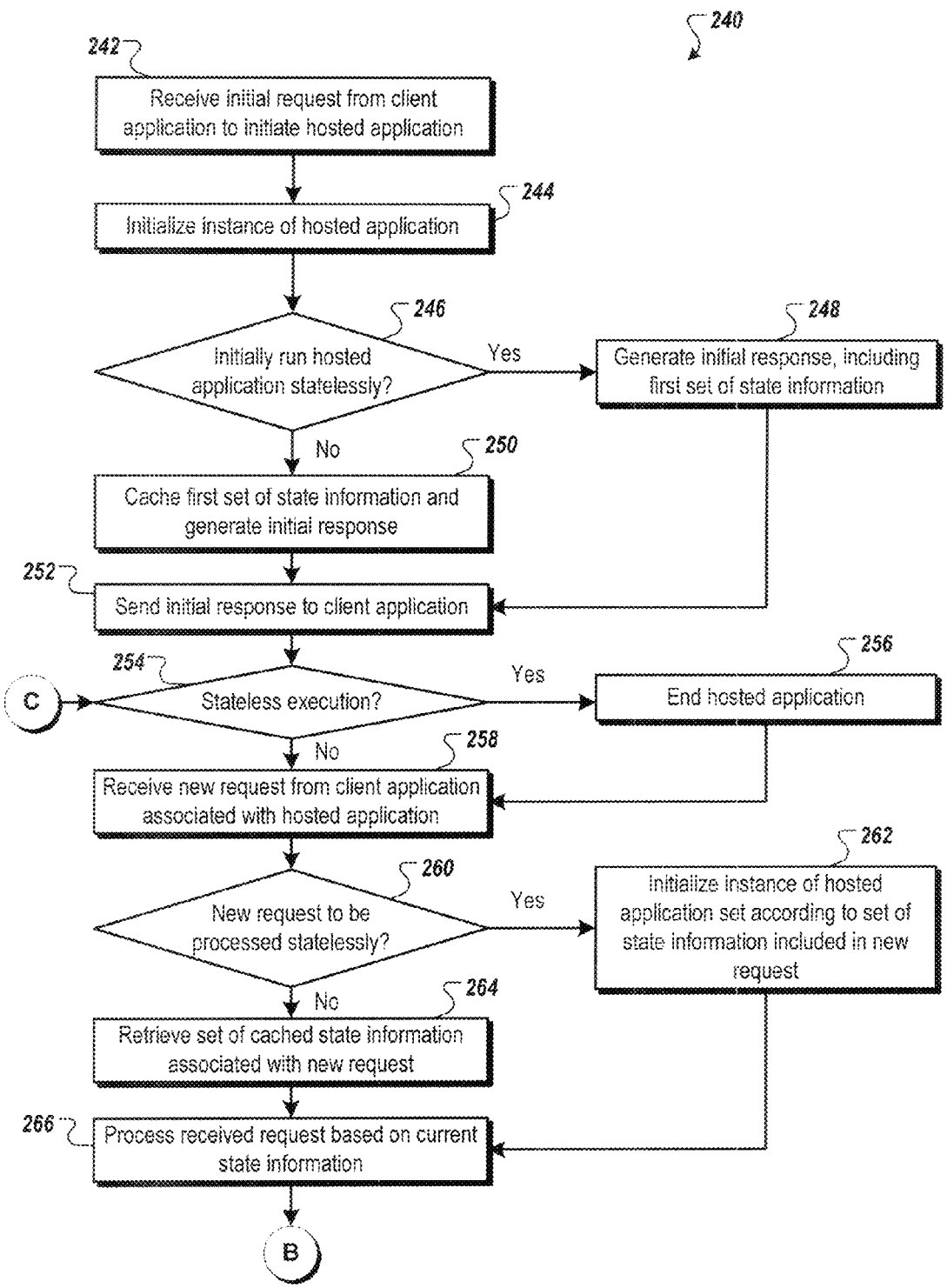
FIGURE 2B-I

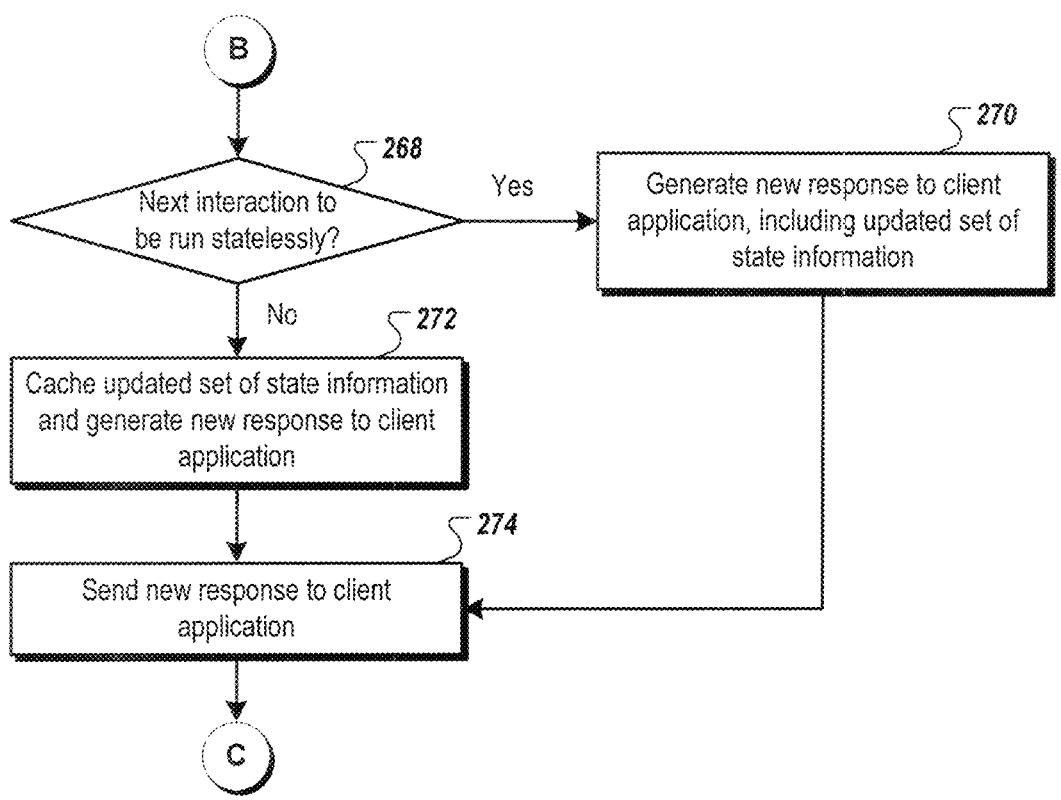
FIGURE 2B-II

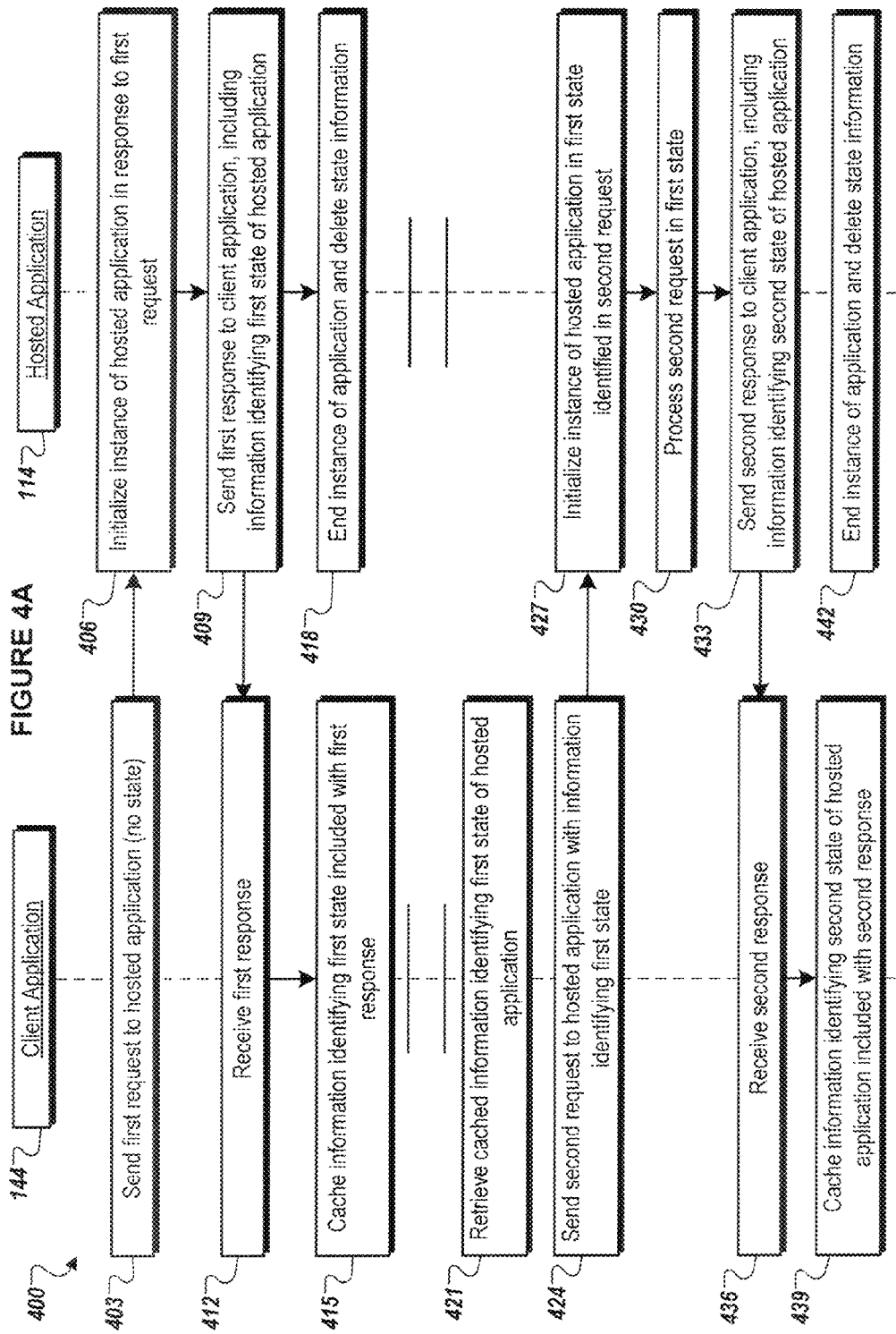

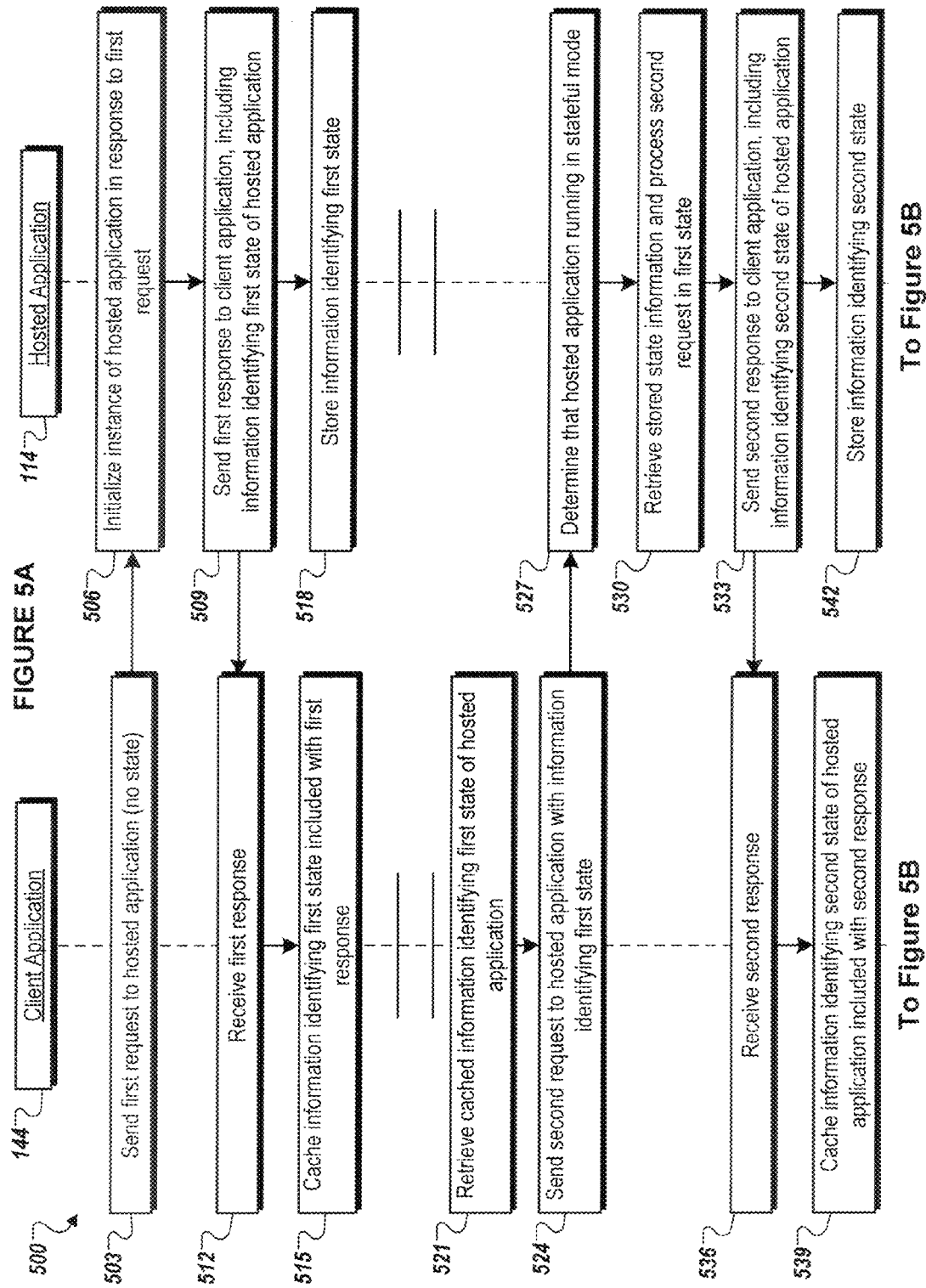

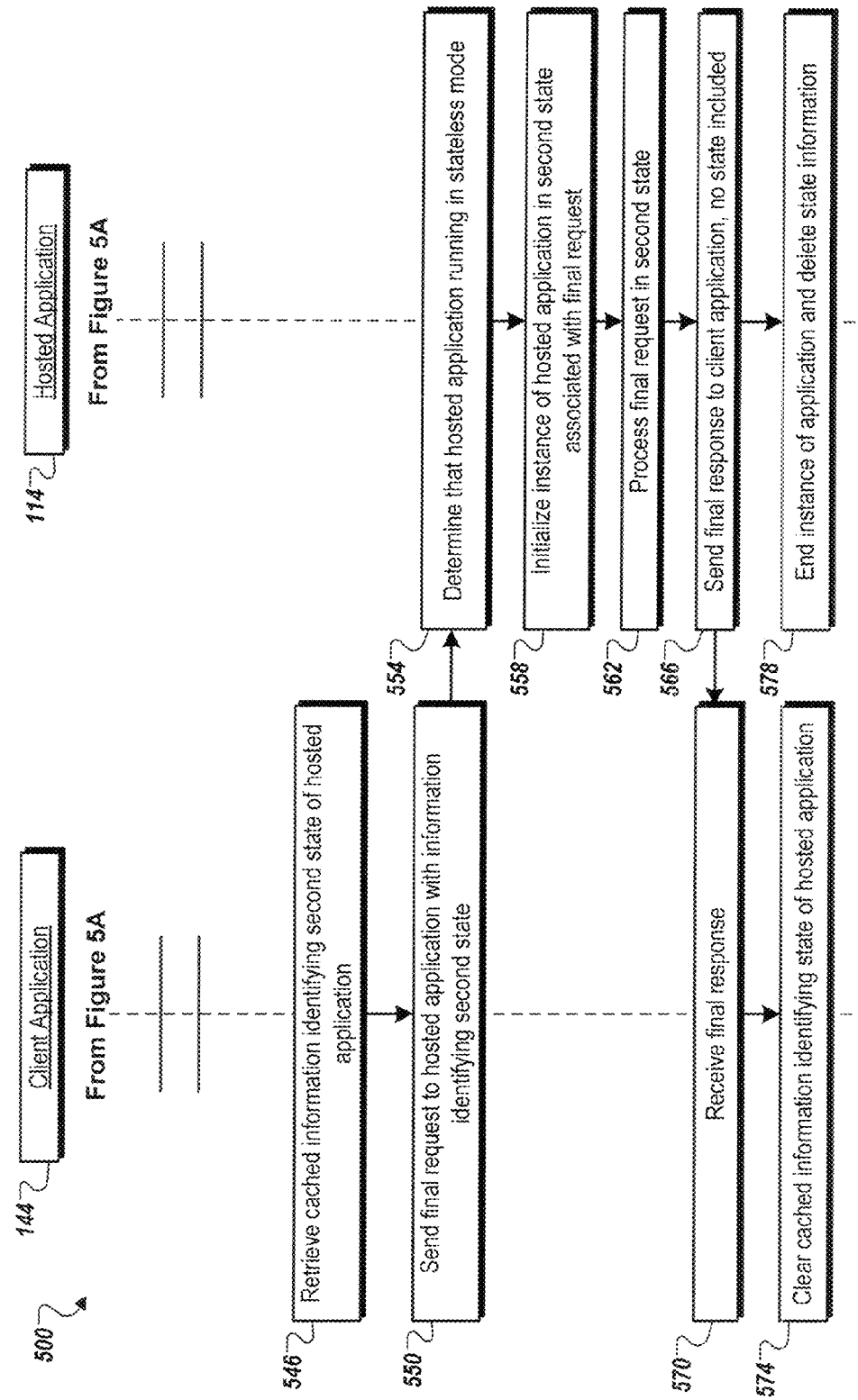

TRANSPARENTLY STATEFUL EXECUTION OF STATELESS APPLICATIONS

TECHNICAL FIELD

This present disclosure relates to stateful execution of applications, and, more particularly, to systems, software, and computer-implemented methods for executing stateless applications in a stateful manner.

BACKGROUND

Many applications, and specifically server-based applications, are run in a stateful mode, meaning that the server running the particular applications maintains, or is responsible for keeping, the application state for the duration of an application session. A particular session state can include information relating to the status of individual components, controllers, views, and contexts, in addition to user interface (UI) elements and models, as well as the various data stored therein. Applications running in a stateful mode depend on the past interactions between users and the application within a particular session to determine the state, which allows the application or a process therein to be easily executed during multiple steps.

An application being run in a stateless mode generally does not keep significant session or other state information on the server between requests from a particular client. In this example context, the term "stateless" does not refer to the overall interaction between the user and the application, but instead to the server in question. When a user runs an application from a client (e.g., a web browser), the particular state of the user and application interaction can be kept via the client requests and server responses sent during the application's execution. For example, the state of the application can be kept visibly within the uniform resource locator (URL) returned by the server, or instead may be hidden inside the response sent to the client.

Stateless applications can provide increased scalability—more users can be served by the same machine with respect to memory considerations and single-user CPU loads. However, stateless applications may also present several disadvantages. For example, processing of requests may be slowed due to the application's need to be restarted and reinitialized upon receipt of each request, as each request contains a specific state in which the application should be prior to processing the request. Next, there can be a constant exchange to ensure that the application and associated client maintain the ever-changing state information that would otherwise be stored and maintained at the server.

SUMMARY

This disclosure provides various embodiments for providing stateful execution of a stateless application. A request associated with an application is received and includes at least one operation to be executed by the application as well as a set of first state information. The application determines if the operations are to be executed statelessly or not. If the application is to be executed statelessly, the first state information is retrieved from the request and used to initialize the application. If not, then the first state of the application is retrieved from a location other than the received request. The operations are then executed by the application in the application's appropriate first state. A response including the relevant information associated with the response as well as an updated set of state information identifying the application's second state is generated and transmitted to the client.

While generally described as computer implemented software that processes and transforms the respective data, some or all of the aspects may be computer implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DESCRIPTION OF DRAWINGS

FIG. 2B is a flowchart illustrating another computer process for providing stateful execution of stateless applications from the perspective of a server running a hosted application using an appropriate system, such as the system described in FIG. 1.

FIGS. 4A-4B are example signaling and flow diagrams illustrating several possible interactions between the client and hosted application used to provide for stateful execution of stateless applications in accordance with the example embodiment described in FIG. 1.

FIGS. 5A-5B are a set of example signaling and flow diagrams illustrating several alternative possible interactions between the client and the hosted application used to provide for substantially transparently switching between stateless and stateful execution of applications.

DETAILED DESCRIPTION

Figure 1:
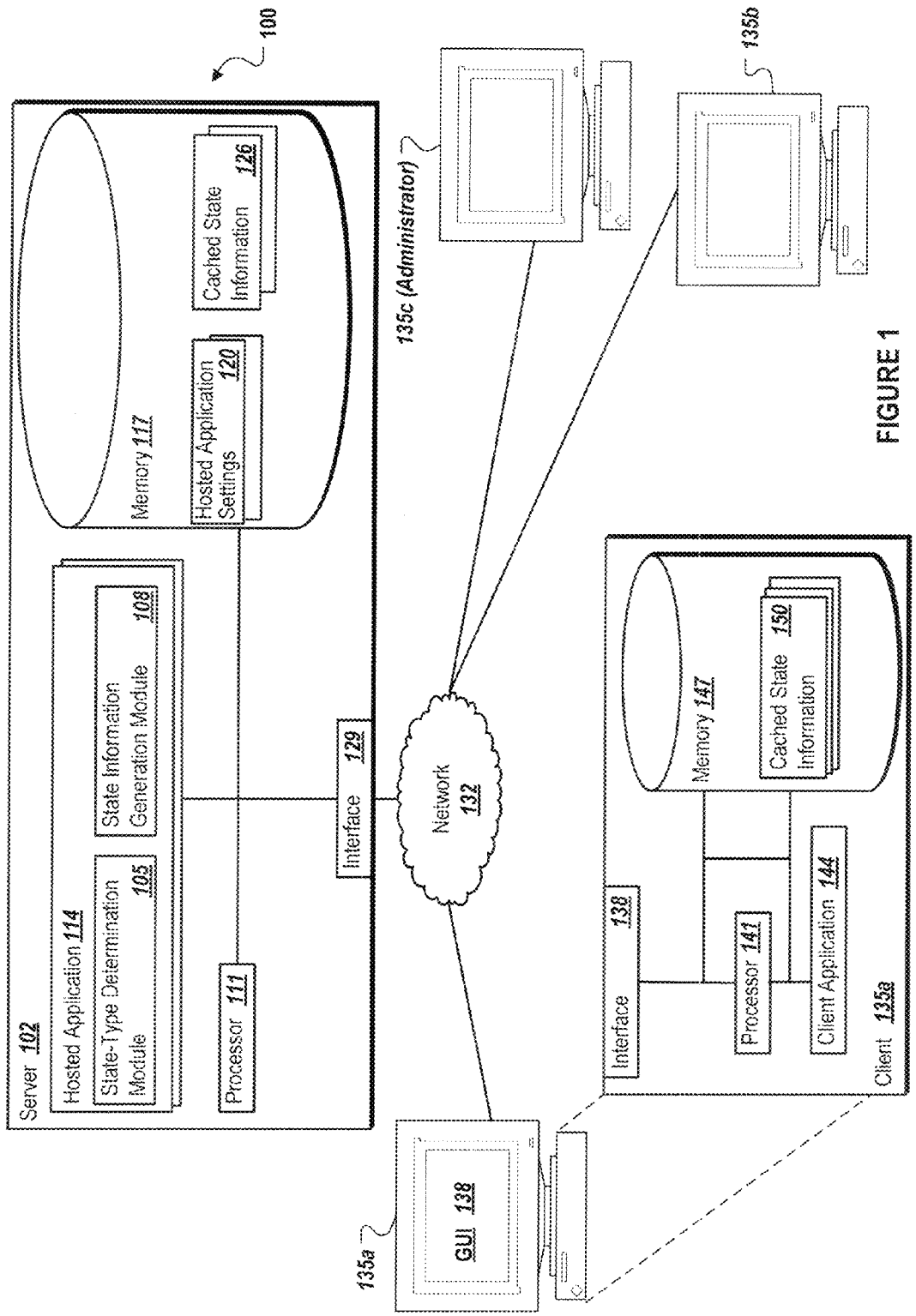
FIG. 1 illustrates an example system for providing stateful execution of stateless applications in a substantially transparent manner in accordance with one embodiment of the present disclosure.

This disclosure generally describes software, computer-implemented methods, and systems for providing stateful execution of stateless applications in a substantially transparent way. This nearly transparent execution can be realized by modifying stateful applications to be able to run in stateless modes when such operation is desired, and in a stateful mode when such operation is desired. In other words, the present disclosure provides systems and methods for dynamically switching from stateful to stateless mode, and back again, during the runtime or execution of an application. In many situations, this dynamic switching provides the advantages of both stateful and stateless execution based on the current runtime environment and also provides developers and the actual users themselves with the ability to select the desired mode of operation in which the application should be executed.

Dynamic switching from one mode to the other may, in some instances, be a natural requirement or transition based on the point or state of an application modified with the described enhancements. Web-based storefronts or shops, for example, provide an excellent example of where the dynamic transition may be advantageous. During the browsing portion of the web shop experience, a stateless execution may provide certain advantages to the owner/developer of the web shop. Specifically, the server supporting the particular application or applications associated with the web shop may be able to service a larger number of users without the need for additional memory or computing power when the users are simply browsing the online catalogs. As users select a particular item and proceed to order one or more of the offered items, the transactional portion of the application (e.g., available to promise, inventory, credit card check, etc.) may be better supported and stable when supported by a stateful paradigm.

By providing applications capable of executing in both stateless and stateful modes, an application developer can manually design certain portions of an application such that the application may only be executed in a particular mode, while in other instances, the application may be designed to perform functions in either mode based on environmental or user-selected input. The application itself, or a related application within the same framework, may take certain environmental criteria, user interactions, or application-based constraints into account and dynamically determine the type of execution most suitable for the current interactions and processing.

In one instance, this dynamic determination is created by treating each request received from a user or client as the initial request to start or execute the application. In other words, each time a request for a stateless application is received by the server, the request is processed similarly to an initial request for a stateful-only application. From the application developer's perspective, designing or modifying each application to behave in this manner allows for relatively significant changes to the application's execution without requiring a new level of complexity from a programming model point of view. Once implemented, the stateless applications can be designed to access the previous application state from the requests received from the client, while also remaining capable of maintaining state information at the server.

In processing each request in the stateless application, the application's phase loop, or execution process, is run twice, whereas the same loop would be run a single time in a stateful application. Specifically, the first run of the stateless application's phase model represents the start-up or initialization of the application according to the state information received with the request. Once the stateless application has been initialized, the application's session state will be the same as if the application has been run in a stateful way. Once the application is in the correct state, only then is the second portion of the phase loop completed. In other words, only after the stateless application is initialized to the proper state are the data changes and relevant events sent by the user/client processed. These data changes and relevant events can be handled by the stateless application in the exact same manner as if the stateless application was executing in its stateful mode. Thus, the addition of the stateless execution avoids forcing developers to modify the core of the application's functionality and programming model.

Further, should a stateless application be executed in its stateful mode, the phase loop can simply be completed once for each request other than the initial request received by the server (e.g., when the application is first initialized). Because the server maintains the session state, and because data changes and events are handled the same way in either mode, whether the application is executing in either a stateless or stateful mode makes no difference to the actual execution of the application itself. Even further, by keeping the application's execution identical in both modes, dynamic changes from one paradigm to the other during runtime, even from request to request, can be accommodated, allowing the most efficient method of operation to be used for each and every action of the application.

Turning to the example implementation of FIG. 1, the illustrated environment 100 includes or is communicably coupled with server 102 and one or more clients 135, at least some of which communicate across network 132. In general, environment 100 depicts an example configuration of a system capable of providing stateful execution of stateless applications in a substantially transparent way, as well as dynamically determining the particular application's mode of operation in response to requests from its clients 135.

In general, the server 102 is any server that stores one or more hosted applications 114, where at least a portion of the hosted applications 114 are executed via requests and responses sent to users or clients within and communicably coupled to the illustrated environment 100 of FIG. 1. In some instances, the server 102 may store a plurality of various hosted applications 114, while in other instances, the server 102 may be a dedicated server meant to store and execute only a single hosted application 114. In some instances, the server 102 may comprise a web server, where the hosted applications 114 represent one or more web-based applications accessed and executed via network 132 by the clients 135 of the system to perform the programmed tasks or operations of the hosted application 114. At a high level, the server 102 comprises an electronic computing device operable to receive, transmit, process, store, or manage data and information associated with the environment 100. Specifically, the server 102 illustrated in FIG. 1 is responsible for receiving application requests from one or more client applications 144 associated with the clients 135 of environment 100 and responding to the received requests by processing said requests in the associated hosted application 114, and sending the appropriate response from the hosted application 114 back to the requesting client application 144. In addition to requests from the external clients 135 illustrated in FIG. 1, requests associated with the hosted applications 114 may also be sent from internal users, external or third-party customers, other automated applications, as well as any other appropriate entities, individuals, systems, or computers. As used in the present disclosure, the term "computer" is intended to encompass any suitable processing device. For example, although FIG. 1 illustrates a single server 102, environment 100 can be implemented using two or more servers 102, as well as computers other than servers, including a server pool. Indeed, server 102 may be any computer or processing device such as, for example, a blade server, general-purpose personal computer (PC), Macintosh, workstation, UNIX-based workstation, or any other suitable device. In other words, the present disclosure contemplates computers other than general purpose computers, as well as computers without conventional operating systems. Further, illustrated server 102 may be adapted to execute any operating system, including Linux, UNIX, Windows, Mac OS, or any other suitable operating system. According to one embodiment, server 102 may also include or be communicably coupled with a mail server.

In the present implementation, and as shown in FIG. 1, the server 102 includes a processor 111, an interface 129, a memory 117, and one or more hosted applications 114. The interface 129 is used by the server 102 for communicating with other systems in a client-server or other distributed environment (including within environment 100) connected to the network 132 (e.g., client 135, as well as other systems communicably coupled to the network 132). Generally, the interface 129 comprises logic encoded in software and/or hardware in a suitable combination and operable to communicate with the network 132. More specifically, the interface 129 may comprise software supporting one or more communication protocols associated with communications such that the network 132 or interface's hardware is operable to communicate physical signals within and outside of the illustrated environment 100.

Generally, the network 132 facilitates wireless or wireline communications between the components of the environment 100 (i.e., between the server 102 and the clients 135), as well as with any other local or remote computer, such as additional clients, servers, or other devices communicably coupled to network 132 but not illustrated in FIG. 1. The network 132 is illustrated as a single network in FIG. 1, but may be a continuous or discontinuous network without departing from the scope of this disclosure, so long as at least a portion of the network 132 may facilitate communications between senders and recipients. The network 132 may be all or a portion of an enterprise or secured network, while in another instance at least a portion of the network 132 may represent a connection to the Internet. In some instances, a portion of the network 132 may be a virtual private network (VPN), such as, for example, the connection between the client 135 and the server 102. Further, all or a portion of the network 132 can comprise either a wireline or wireless link. Example wireless links may include 802.11a/b/g/n, 802.20, WiMax, and/or any other appropriate wireless link. In other words, the network 132 encompasses any internal or external network, networks, sub-network, or combination thereof operable to facilitate communications between various computing components inside and outside the illustrated environment 100. The network 132 may communicate, for example, Internet Protocol (IP) packets, Frame Relay frames, Asynchronous Transfer Mode (ATM) cells, voice, video, data, and other suitable information between network addresses. The network 132 may also include one or more local area networks (LANs), radio access networks (RANs), metropolitan area networks (MANs), wide area networks (WANs), all or a portion of the Internet, and/or any other communication system or systems at one or more locations.

As illustrated in FIG. 1, server 102 includes a processor 111. Although illustrated as a single processor 111 in FIG. 1, two or more processors may be used according to particular needs, desires, or particular embodiments of environment 100. Each processor 111 may be a central processing unit (CPU), a blade, an application specific integrated circuit (ASIC), a field-programmable gate array (FPGA), or another suitable component. Generally, the processor 111 executes instructions and manipulates data to perform the operations of server 102 and, specifically, the one or more plurality of hosted applications 114. Specifically, the server's processor 111 executes the functionality required to receive and respond to requests from the clients 135 and their respective client applications 144, as well as the functionality required to perform the other operations of the hosted application 114. Regardless of the particular implementation, "software" may include computer-readable instructions, firmware, wired or programmed hardware, or any combination thereof on a tangible medium operable when executed to perform at least the processes and operations described herein. Indeed, each software component may be fully or partially written or described in any appropriate computer language including C, C++, Java, Visual Basic, assembler, Perl, any suitable version of 4GL, as well as others. It will be understood that while portions of the software illustrated in FIG. 1 are shown as individual modules that implement the various features and functionality through various objects, methods, or other processes, the software may instead include a number of sub-modules, third party services, components, libraries, and such, as appropriate. Conversely, the features and functionality of various components can be combined into single components as appropriate. In the illustrated environment 100, processor 111 executes one or more hosted applications 114 on the server 102.

At a high level, each of the one or more hosted applications 114 is any application, program, module, process, or other software that may execute, change, delete, generate, or otherwise manage information according to the present disclosure, particularly in response to and in connection with one or more requests received from the illustrated clients 135 and their associated client applications 144. In certain cases, only one hosted application 114 may be located at a particular server 102. In others, a plurality of related and/or unrelated hosted applications 114 may be stored at a single server 102, or located across a plurality of other servers 102, as well. In certain cases, environment 100 may implement a composite hosted application 114. For example, portions of the composite application may be implemented as Enterprise Java Beans (EJBs) or design-time components may have the ability to generate run-time implementations into different platforms, such as J2EE (Java 2 Platform, Enterprise Edition), ABAP (Advanced Business Application Programming) objects, or Microsoft's .NET, among others. Additionally, the hosted applications 114 may represent web-based applications accessed and executed by remote clients 135 or client applications 144 via the network 132 (e.g., through the Internet). Further, while illustrated as internal to server 102, one or more processes associated with a particular hosted application 114 may be stored, referenced, or executed remotely. For example, a portion of a particular hosted application 114 may be a web service associated with the application that is remotely called, while another portion of the hosted application 114 may be an interface object or agent bundled for processing at a remote client 135. Moreover, any or all of the hosted applications 114 may be a child or sub-module of another software module or enterprise application (not illustrated) without departing from the scope of this disclosure. Still further, portions of the hosted application 114 may be executed by a user working directly at server 102, as well as remotely at client 135.

At least one of the hosted applications 114 are capable of being executed in both stateful and stateless modes. In a stateful mode, information associated with the interaction between the hosted application 114 and an interacting client 135 (or its client application 144) is stored at the server 102, or another location closely associated with the hosted application 114 such that state and session information is readily kept during the execution of the hosted application 114. In a stateless mode, information associated with the interaction between the hosted application 114 and client 135 is not maintained by the hosted application 114, and instead is provided to the client 135 or client application 144 during each request/response exchange. In some instances, the hosted application 114 may prepare for both future stateful and stateless executions by providing state and session information to the client 135 in a particular response, while at the same time, storing the same state and session information at the server 102 or another stateful-associated location. Still further, some hosted applications 114 may be designed or appropriate only for either stateful or stateless execution, such that each time the particular hosted application is executed, it is executed in its sole available mode of operation.

As illustrated, the hosted applications 114 each include two modules: a state-type determination module 105 and a state information generation module 108. These modules may be embedded within the hosted application 114 as shown in FIG. 1, or instead may be communicably coupled to the hosted application 114 within the server 102. In still further instances, either or both of the modules may be located external to the server 102 and perform their relative functionality through communications and interactions facilitated by network 132. Each module may be an agent, daemon, object, service, plug-in, or other software capable of performing the respective module's functionality and operations. Additionally, each module may simply represent a portion of the hosted application's 114 programming, such that the module itself is inseparable from or an integral part of the hosted application 114.

Turning to the first of the two modules, the state-type determination module 105 is used by a particular hosted application 114 in FIG. 1 to determine whether a particular request, or series of requests, received from a client 135 or client application 144 are to be handled and processed in a stateful or stateless manner. In some instances, the state-type determination module 105 may receive explicit instructions from a request to execute the hosted application 114 in a certain mode. For instance, the client 135 may explicitly state that the hosted application 114 is to be run in either a stateful or stateless manner for a particular instance of execution. Alternatively, the state-type determination module 105 may access certain information associated with the hosted application 114 (e.g., a set of hosted application settings 120 stored in memory 117), as well as the hosted application 114 itself, to determine (1) if the hosted application 114 is capable of being run in both modes, and (2) if so, whether specifically-defined settings outside the current request mandate that the application be run in a specific mode. Still further, if the particular hosted application 114 is capable of being executed both statefully and statelessly, the state-type determination module 105 can dynamically determine, based on any number of variables in the system, in which mode the hosted application 114 should be executed. For example, the hosted application 114 may be generated from a plurality of individual components, each performing specific and/or distinct activities to allow the hosted application 114 to function. Some of the individual components may be capable of stateless execution, while some of the components may be limited to stateful execution. In these situations, the state-type determination module 105 may determine that because one or more of the components within the hosted application 114 cannot be statelessly executed, the hosted application 114 as a whole should be executed in a stateful manner.

Alternatively, the state-type determination module 105 may review the received request to determine whether processing said request will require the non-stateless components to be used or needed. If the non-stateless components will not be used to process the request and create the response, then the state-type determination module 105 can determine that the current request can be handled statelessly by the hosted application 114. In still another example, the hosted application 114 may attempt to cover for the possibility of either a stateless or stateful execution when generating the previous response, including the information necessary for stateless execution with the response to the client 135 while also storing the information locally, such as in a set of cached state information 126 in memory 117. Based on the amount of time between the response and the next request, the information stored in the set of cached state information 126 may be "timed-out" such that the data is erased and the memory space reallocated. The particular timeout value can be determined on an application-to-application basis, and need not be discussed herein. However, in determining whether to run the application in a stateless or stateful manner, the state-type determination module 105 can determine whether the timeout value has been exceeded since the previous response. If the timeout has not been exceeded, the state-type determination module 105 can determine that the hosted application 114 can access the set of cached state information 126 to retrieve the state and session information and perform in a stateful manner. If the timeout value has been exceeded, the state-type determination module 105 can determine that the state and session information are no longer available at the server 102, and instruct the hosted application 114 to execute the request in a stateless manner.

Still further, the state-type determination module 105 can assess the runtime environment of the server 102 and associated elements at the time of the request to determine whether the hosted application 114 should be executed in a stateful or stateless manner. Specifically, if many instances of the hosted application 114 are being executed in response to a plurality of requests from multiple clients, the state-type determination module 105 may determine that in order to minimize the memory load at the server 102, state-related information should be handled in a stateless manner. This may include having the hosted application 114 only send the state information in its response to the client 135 without storing the state information at the server 102 for any amount of time, or instead the hosted application 114 may use the state information received with the request rather than information stored in memory 117 to execute the hosted application 114 in response to the request. Various runtime information may be used by the state-type determination module 105 to determine the application's mode, and a trade-off of advantages and disadvantages may be weighed prior to the decision. Specifically, in stateful execution more main memory is generally required to maintain the session state for the hosted application 114, while in stateless execution the processing time to reinitialize the hosted application 114 after each request (in order to place the hosted application 114 in the correct state) may require additional CPU and processing resources. By analyzing the current and dynamic characteristics of the system, the state-type determination module 105 determines the particular state-type for the application to be run, passing the information to the hosted application 114 prior to its execution. In some instances, the decision on the type of execution to be performed may be determined when the response to a request is sent by the hosted application 114 such that the mode is set, or alternatively, the mode may be determined upon receiving each new request from the client 135.

The second module of each hosted application 114, the state information generation module 108, performs the operations necessary to generate the state information associated with the hosted application 114 that is to be sent to the client 135 in the responses used for stateless execution. In some instances, the state information generation module 108 will generate the stateless execution state information only when the state-type determination module 105 determines that a stateless mode of execution will be used. In other words, if the hosted application 114 is to be run in a stateful manner, no state information will be included with the hosted application's 114 response to the client 135. However, in some embodiments, the state information generation module 108 will analyze and generate state information on the hosted application 114 after processing each request, and integrate that information into the response prior to the response being returned to the client 135 or client application 144. By generating and including the state information for each response, the client 135, in each subsequent request, is given the ability to provide information sufficient to allow the hosted application 114 to run in a stateless manner, regardless of whether the hosted application 114 is actually executed.

The state generation module 108 can generate the state information for the response in various methods. In some embodiments, the generated state information can be serialized into a string included within the visible portion of the URL returned with the hosted application's 114 response. This option allows the state information to be visibly included in the URL address (such as a URL parameter or post-URL fragment), which in turn allows clients 135 to keep such URLs as bookmarks or favorites, send them to other clients 135, re-enter the application at the same state it was left from anywhere where the particular URL can be inserted into a web browser or the like, and, in general, access the hosted application 114 in the exact location and state associated with the received response at any time.

Alternatively, the state information can be generated and included as part of the response, but not included in the URL, and passed to the client 135 by the hosted application 114. This may be done for any number of reasons, including the fact that URLs are generally limited in size. For instance, a set of state information may be too large to fit within a single URL, and thus may be kept invisibly within the response. Additionally and/or alternatively, it may be easier to keep state information from independent components separate within the response (e.g., as individual parameters within the response) rather than keeping the various states of multiple components in a single, agreed-upon URL. In this instance, the same client 135 and/or client application 144 will be able to store and retrieve the state information from the response when re-accessing or utilizing the application. One disadvantage of hiding the information, however, is that other clients 135 and client applications 144 may not be able to access the exact state of the application associated with the response at a later time. However, with regard to privacy and security, such embodiments may be advantageous in that they ensure that a particular user's or client application's previous state information cannot be readily accessed or used by an unauthorized entity. Any other method for including the state information with the response may be used, so long as the state information generation module 108 retrieves the necessary information from the hosted application 114 when creating the state information so that upon re-initialization of the hosted application 114 by the client 135, the previous state of the hosted application 114 may be easily retrieved. Additionally, for instances where multiple stateless components, or a combination of stateless and stateful components, are used to create a single hosted application 114, the state information generation module 108 can generate state information for each of the stateless components after the response is initially generated, and include the totality of the information in the response sent to the client 135.

The server 102 also includes memory 117. Memory 117 may include any memory or database module and may take the form of volatile or non-volatile memory including, without limitation, magnetic media, optical media, random access memory (RAM), read-only memory (ROM), removable media, or any other suitable local or remote memory component. Memory 117 may store various objects or data, including classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the server 102 and its one or more hosted applications 114. Additionally, memory 117 may include any other appropriate data, such as VPN applications, firmware logs and policies, firewall policies, a security or access log, print or other reporting files, as well as others.

Specifically, illustrated memory 117 includes a set of hosted application settings 120 and a set of cached state information 126. Although illustrated within memory 117, some or all of the illustrated elements may be located or stored outside of memory 117 and/or server 102 (e.g., in different memories and/or on multiple different servers, as well as in other locations external to, but communicably coupled with, environment 100). For example, the set of hosted application settings 120 may be included within the programming of each associated hosted application 114 such that the settings are inherent to the hosted application 114 itself. Additionally, some or all of the set of hosted application settings 120 may be stored at and specific to a particular client 135, and stored in the client's respective memory. In those instances, particular settings stored at the client 135 can be sent along with the requests to the hosted application 114 in order to allow the hosted application 114 to be initialized and executed in accordance with the proper settings. In general, the set of hosted application settings 120 may include information such as a particular hosted application's 114 preferred modes of operation for various requests and operations. This information can then be accessed by the state-type determination module 105 when requests are received and used to determine whether the hosted application 114 should be executed in a stateless or stateful manner. Additionally, any other information relevant to the particular hosted applications 114 can be stored in and included with the set of hosted application settings 120 in particular embodiments.

Illustrated memory 117 also includes a set of cached state information 126 representing the state information stored when one of the hosted applications 114 is run in its stateful manner. Specifically, information representing the application's particular state is accessed by the hosted application 114 as requests are received, and updated as those requests are processed and events occur. As previously mentioned, even when the hosted application 114 is executed in its stateless mode, state information from the hosted application 114 may be stored in the set of cached state information 126. In order to preserve memory space, all or a portion of the set of cached state information 126 may be associated with a particular timeout value, such that specific portions of the cached state information 126 acts as temporary storage of the hosted applications 114 state information. If, after sending the response, the hosted application 114 receives an additional request from the client 135 before the end of the timeout value, state information from the set of cached state information 126 may be accessed and used instead of the state information included with the client's request. One example of such a use is a web-based chess application. In some instances, chess may be played at a high-rate of speed or under time constraints, such that an entire game of chess is played in a relatively short period of time. In those instances, the scenario and timeout value of the cached state information 126 may be set so that state information is stored for an adequate amount of time to allow moves to be made in a stateful execution of the application. However, in some instances, a game of chess may be played over a longer period, such as days or weeks. In those instances, maintaining the state of the chess application would not be prudent. In such an example, the entire state of the chess application may be included with each response, and likely included in the respective URL, in order to allow the player to send the current state of the application (e.g., after the next move) to the player's opponent via electronic mail, instant messaging, or some other medium. By accessing the generated URL, the player's opponent can quickly access the board exactly as it existed before without the need to store the state information on the server 102 in between requests, thus saving memory space while maintaining the chess application's state.

The illustrated environment of FIG. 1 also includes one or more clients 135. Each client 135 may be any computing device operable to connect to or communicate with at least the server 102 and/or via the network 132 using a wireline or wireless connection. Further, as illustrated by client 135a, each client 135 includes a processor 141, an interface 138, a graphical user interface (GUI) 138, a client application 144, and a memory 147. In general, each client 135 comprises an electronic computer device operable to receive, transmit, process, and store any appropriate data associated with the environment 100 of FIG. 1. It will be understood that there may be any number of clients 135 associated with, or external to, environment 100. For example, while illustrated environment 100 includes three clients (135a, 135b, and 135c), alternative implementations of environment 100 may include a single client 135 communicably coupled to the server 102, or any other number suitable to the purposes of the environment 100. Additionally, there may also be one or more additional clients 135 external to the illustrated portion of environment 100 that are capable of interacting with the environment 100 via the network 132. Further, the term "client" and "user" may be used interchangeably as appropriate without departing from the scope of this disclosure. Moreover, while each client 135 is described in terms of being used by a single user, this disclosure contemplates that many users may use one computer, or that one user may use multiple computers. As used in this disclosure, client 135 is intended to encompass a personal computer, touch screen terminal, workstation, network computer, kiosk, wireless data port, smart phone, personal data assistant (PDA), one or more processors within these or other devices, or any other suitable processing device. For example, each client 135 may comprise a computer that includes an input device, such as a keypad, touch screen, mouse, or other device that can accept user information, and an output device that conveys information associated with the operation of the server 102 (and hosted application 114) or the client 135 itself, including digital data, visual information, the client application 144, or the GUI 138. Both the input and output device may include fixed or removable storage media such as a magnetic storage media, CD-ROM, or other suitable media to both receive input from and provide output to users of the clients 135 through the display, namely, the GUI 138. As indicated in FIG. 1, client 135c is specifically associated with an administrator of the illustrated environment 100. The administrator 135c can modify various settings associated with one or more of the other clients 135, the server 102, the hosted application 114, and/or any relevant portion of environment 100. For example, the administrator 135c may be able to modify the relevant timeout values associated with each hosted application 114, as well as any of the set of hosted application settings 120, including those associated with the state-type determination module 105 or state information generation module 108 of the hosted application 114.

Importantly, each client 135 includes a client application 144 associated with the hosted application 114. In particular, the client application 144 is any software, such as a web browser or remote portion of the hosted application 114, that allows the client 135 to access and work with the hosted application 114. Particularly, the client application 144 is a software application that enables the client 135 (or a user thereof) to display and interact with one or more of the hosted applications 114 executed at the server 102. Where the hosted applications 114 are web-based applications, the client application 144 may be specific applications dedicated to use with a particular hosted application 114, a general web browser with adequate functionality to interact with the hosted application 114, or any other appropriate software.

Further, the illustrated client 135 includes a GUI 138 comprising a graphical user interface operable to interface with at least a portion of environment 100 for any suitable purpose, including generating a visual representation of the client application 144 (in some instances, the client's web browser) and the interactions with the hosted application 114, including the responses received from the hosted application 114 received in response to the requests sent by the client application 144. Generally, through the GUI 138, the user is provided with an efficient and user-friendly presentation of data provided by or communicated within the system. The term "graphical user interface," or GUI, may be used in the singular or the plural to describe one or more graphical user interfaces and each of the displays of a particular graphical user interface. Therefore, the GUI 138 can represent any graphical user interface, including but not limited to, a web browser, touch screen, or command line interface (CLI) that processes information in environment 100 and efficiently presents the information results to the user. In general, the GUI 138 may include a plurality of user interface (UI) elements, some or all associated with the client application 144, such as interactive fields, pull-down lists, and buttons operable by the user at client 135. These and other UI elements may be related to or represent the functions of the client application 144, as well as other software applications executing at the client 135. In particular, the GUI 138 may be used to present the client-based perspective of the hosted application 114, and may be used (as a web browser or using the client application 144 as a web browser) to view and navigate the hosted application 114, as well as various web pages located both internal and external to the server, some of which may be associated with the hosted application 114. For purposes of the present location, the GUI 138 may be a part of or the entirety of the client application 144, while also merely a tool for displaying the visual representation of the client and hosted applications' 114 actions and interactions. In some instances, the GUI 138 and the client application 144 may be used interchangeably, particularly when the client application 144 represents a web browser associated with the hosted application 114.

Similar to the server 102, the illustrated clients 135 include both an interface 138 and processor 141. The interface 138 of each client 135 may be similar to the interface 129 of the server 102, in that it may comprise logic encoded in software and/or hardware in a suitable combination and operable to communicate with the network 132. More specifically, interface 138 may comprise software supporting one or more communication protocols such that the network 132 or hardware is operable to communicate physical signals to and from the client 135. The client's processor 141 may also be similar in nature to that of the server's processor 111. Again, although only illustrated as a single processor 141, two or more processors may be used according to particular needs, desires, or embodiments of environment 100. Similar to the server's processor 111, each client processor 141 may be a central processing unit (CPU), a blade, an application specific integrated circuit (ASIC), a field-programmable gate array (FPGA), or another suitable component. Generally, the processor 141 executes instructions and manipulates data to perform the operations of the client 135 and, specifically, the associated client application 144 described above. Specifically, the client's processor 141 executes the functionality required to send requests from the client 135 and its client application 144, as well as receive and process the associated responses from the hosted application 114.

Each client 135 also includes a memory 147. Memory 147 may be similar to the server's memory 117, and may include any memory or database module, taking the form of either volatile or non-volatile memory including, without limitation, magnetic media, optical media, random access memory (RAM), read-only memory (ROM), removable media, or any other suitable local or remote memory component. For example, memory 147 may store backup data, parameters, cookies, variables, algorithms, instructions, rules, or references thereto, as well as any other suitable data. As specifically illustrated, memory 147 includes a set of cached state information 150 associated with the client application 144. The set of cached state information 150 is used by the client application 144 to cache, or store, state information associated with the responses received from the hosted application 114 during client-hosted application interactions. In some instances, the set of cached state information 150 may store only the most recent state information associated with the hosted application 114, while in other instances, the set of cached state information 150 may store additional information about previous application states, thereby allowing the client application 144 to "go back" to previous states if the user is so inclined. Importantly, the set of cached state information 150 may represent the only stored set of state information associated with a hosted application 114 being executed statelessly. Therefore, loss of the data stored in the set of cached state information 150 without an adequate backup copy would result in a loss of the previous states of the hosted application 114 for a particular user to be lost forever. When the client application 144 generates a request to be sent to the hosted application 114, the client application 144 can access the set of cached state information 150 to retrieve and integrate the current state information into the request prior to transmission to the hosted application 114.

While FIG. 1 is described as containing or being associated with a plurality of elements, not all elements illustrated within environment 100 of FIG. 1 may be utilized in each alternative implementation of the present disclosure. Additionally, one or more of the elements described herein may be located external to environment 100, while in other instances, certain elements may be included within or as a portion of one or more of the other described elements, as well as other elements not described in the illustrated implementation. Further, certain elements illustrated in FIG. 1 may be combined with other components, as well as used for alternative or additional purposes in addition to those purposes described herein.

Figure 2A:
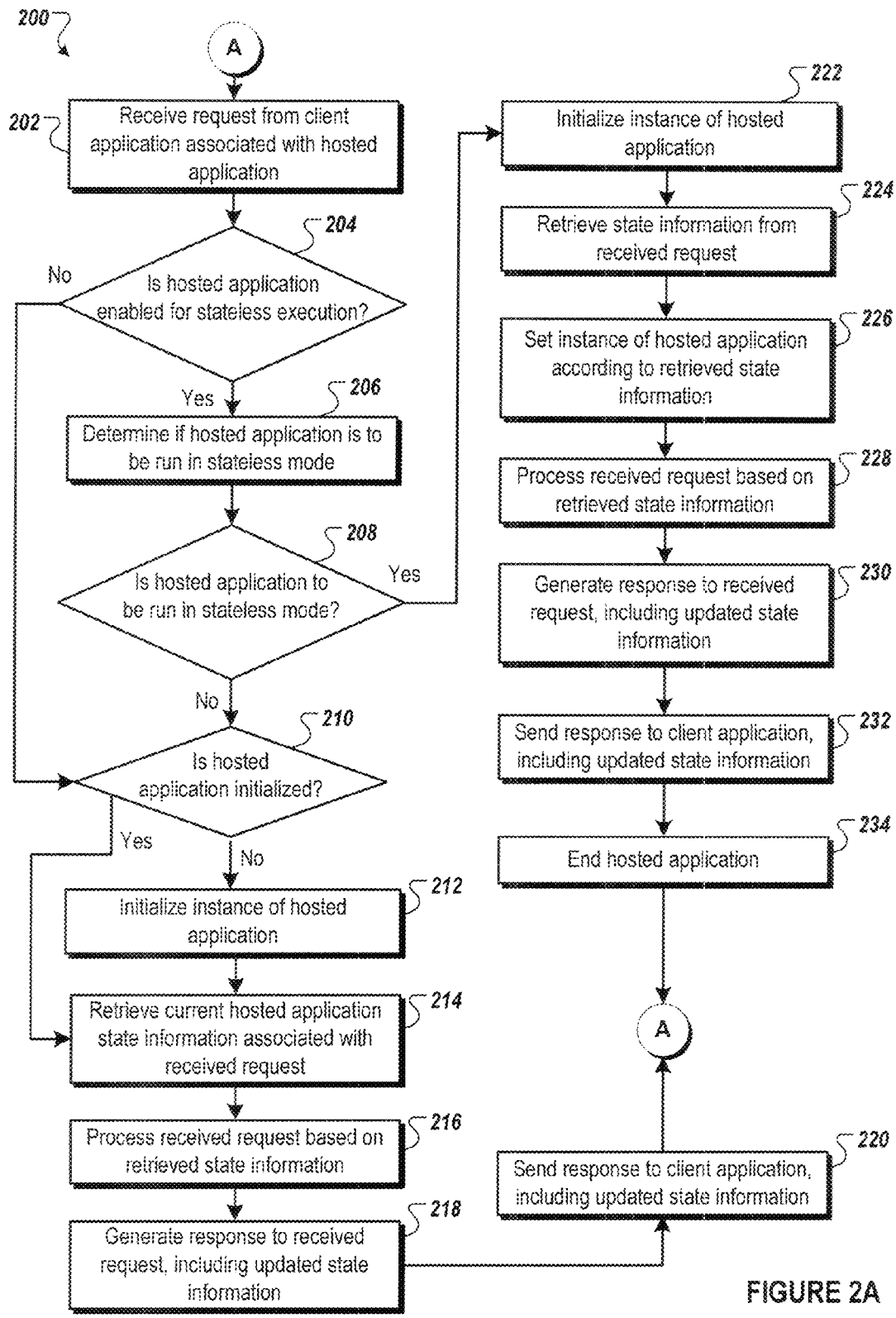
FIG. 2A is a flowchart illustrating an example computer process for providing stateful execution of stateless applications from the perspective of a server running a hosted application using an appropriate system, such as the system described in FIG. 1.

FIG. 2A is a flowchart illustrating one particular implementation of a computer implemented method 200 (or process) for providing stateful execution of stateless applications in a substantially transparent way from the perspective of a server executing a hosted application. For clarity of presentation, the description that follows generally describes method 200 in the context of environment 100 illustrated in FIG. 1. However, it will be understood that method 200 may alternatively be performed by any other suitable system, environment, or combination of systems and environments, as appropriate.

At 202, the server receives a request from a client application associated with a hosted application stored and executed at the server. In some instances, the request from the client application may be received from a web browser representing the client application, such a the client application 144 associated with client 135 in FIG. 1. Further, the request itself may be received via the network 132 of FIG. 1 and represented in the form of a hypertext transfer protocol (HTTP) request. In this particular example, the hosted application will be considered a web-based application, accessible via a connection to the Internet or a private intranet connection, allowing for interaction with the client application (or web browser) through various HTTP requests and responses. Additionally, the hosted application may be associated with a particular URL, such that the received request is directed to that particular URL, and is intended to initiate or execute the associated hosted application.

At 204, the server determines whether or not the requested hosted application is enabled for stateless execution. In many instances, the hosted application may be created from or represent a plurality of sub-modules and other components, each maintaining or requiring the maintenance of its own state information. In some embodiments, if one or more components of the application are not enabled for stateless execution, then the hosted application, even though certain other components are so enabled, may not be used in a stateless execution. Additionally, some legacy applications may not be capable of or may not have been adapted to execute statelessly. If either of these instances is the case, then method 200 moves to 210, avoiding the steps associated solely with applications enabled for stateless execution. However, if the hosted application is enabled for stateless execution, then method 200 continues at 206.

At 206 the server, having determined that the hosted application is enabled or capable of stateless execution, then determines whether the hosted application is to be actually run or executed in its stateless mode. In the illustrated environment of FIG. 1, the determination is made by the state-type determination module 105 embedded within the hosted application 114. A plurality of relevant variables may affect the server's determination of whether the hosted application is to be run statefully or statelessly, and include any of the following, as well as any other relevant consideration. For example, the determination may be explicitly defined by the request received at 202. In those instances, the user of the associated client application can manually select either a stateless or stateful execution based on the user's preference, the intended use of the hosted application, or for testing and comparison purposes (e.g., determining the preferred method of execution for a particular application or application scenario). In other instances, the determination may be based on specific user behavior other than the explicit decision to run the hosted application in a stateless or stateful mode. For example, if state information is stored at the server until a predetermined timeout value is exceeded (i.e., in a temporary memory location), then the server may determine whether or not the time since the last response is within the defined threshold. If the state information remains stored at the server, then the hosted application can be run in a stateful manner, while if the state information is only available via the request itself, the application may be run in a stateless manner. Additionally, whether the hosted application is run in a stateless or stateful manner can be determined depending on the usage scenario at the time of the request, such as by a survey and analysis of the current runtime environment. For example, the server (or the hosted application itself) may be configured to run the hosted application in its stateless mode if a certain number of users are currently using or accessing the hosted application, or whether a certain memory threshold has been reached. Additionally, the determination may be made based on the speed of the network connection with the client, the CPU load at the time of the request, the particular client sending the request, the type of network being used (e.g., an Internet request vs. an intranet request), or any other criteria associated with the runtime environment at or around the time of the request. By providing the availability of such dynamic determinations, software and application developers can provide applications with the ability to perform in either mode, and allow the server to make the most efficient decision on how the application is to actually be executed at the time the application is requested. In other words, once the application is designed with the dual-mode ability, future mode determinations can be made without specific developer instructions other than any hard-coded guidelines and/or predefined settings associated with the application. Providing such robust and dynamic capabilities allows hosted applications and their associated servers to be used as efficiently as possible and maximizing, as opposed to wasting, system resources during execution.

Based on the analysis of 206, method 200 determines at 208 whether the hosted application is to be run in a stateless mode. If method 200 determines that the hosted application is not to be run in a stateless mode with regard to the current request (or is determined to be run in a stateful mode), method 200 continues at 210. If, however, method 200 determines that the hosted application is to be run in a stateless mode, then method 200 continues at 222. The situation where the hosted application is to be statefully executed will be addressed first.

Once determined to run statefully, method 200 begins at 210. At 210, the server determines whether or not the hosted application has been initialized. Generally, when run in its stateful mode, the hosted application need only be initialized once after the first request is received from the client, as the hosted application's state is maintained at the server or by the hosted application itself as it is run in its stateful mode. In some instances, however, the determination of whether or not the hosted application is to be run statefully is determined on a request-to-request basis, such that the determination of 210 may need to be performed each time method 200 determines the hosted application is to be run statefully. If the hosted application is not initialized, then method 200 moves to 212 where the hosted application is initialized or started. If, however, the hosted application is already initialized, method 200 continues at 214.

At 214, the current state information for the hosted application that is associated with the current request is retrieved from the server. If the request received at 202 is the first request of the client/server interaction, then the hosted application will have no present state, and no state information may be available to the application. Otherwise, any state information associated with the client/server interaction will be retrieved from the set of state information maintained by the server so that the hosted application can be placed into the correct state prior to processing the request.

Once the relevant state information is retrieved from the server, the received request is processed in the relevant state of the application at 216. For example, any events requested by the user (and included in the received request) may be performed by the hosted application, and any data changes included in the received instruction may be executed. Once the request is processed (e.g., its events handled and the specified data is modified), the server and/or the hosted application generates an appropriate response to the request at 218. Because the system of the present disclosure is meant to be capable of performing in both a stateful and stateless manner, the generated response includes a set of updated state information that will be provided to the client or client application that sent the request at 202. Although not illustrated, the hosted application may store the state information locally in connection with generating the response. For example, the updated state information may be stored in the set of cached state information 126 illustrated in FIG. 1, and, in some instances, stored there for a specified period of time (i.e., until the timeout value is exceeded). Once the response is generated, method 200 continues at 220, where the generated response, including the updated state information, is sent to the client application. Once the response is sent, method 200 returns to 202, where the server awaits another request from the client prior to continuing.

Returning to the decision of 208, if the hosted application is to be executed in its stateless mode, then method 200 continues at 222. Similar to when the hosted application is to be run in its stateless mode, an instance of the hosted application is reinitialized, or re-started, upon beginning execution in the stateless mode. Specifically, the hosted application is restarted in the stateless mode because the state of the application will be determined based solely upon the information received with the client's request. Once the hosted application is initialized, the server or hosted application analyzes the received request, and retrieves the state information included therein at 224. If, for instance, the request is for a particular web-based application, and includes the state information as part of the URL of the request, the server or hosted application can parse the received URL and retrieve the URL fragment representing the particular state in which the hosted application should be placed. Any other suitable processing technique may be used by the server or hosted application to retrieve the state information as is appropriate based on the manner in which the client transmitted the state information to the server. In some instances, additional processing of a text string or other data container comprising the state information may be contemplated within the retrieval step of 224.

Once the state information received with the request is retrieved and appropriately processed, at 226 the instance of the hosted application is set to the appropriate state indicated by and included in the request of 202. Once the hosted application is set to the appropriate state, the received request (other than the state information) is processed by the server or the hosted application at 228. In many instances, the operations performed at 228 will be identical to those performed at 216 in the stateful portion of FIG. 2A. In other words, other than the initialization steps of the stateless execution (which will be the same for both modes with regard to the hosted application's response to the first request), stateless and stateful executions are treated nearly identically by the hosted application. In processing the request, any events requested by the user (and included in the received request) are performed by the hosted application, and any changes to the hosted application's data may be made. Once the request is processed (e.g., its events handled and any specified data modified), the server and/or the hosted application generates an appropriate response to the request at 230, where the response includes the updated state information defining the state of the application after the processing of 228 is complete. Again, the updated state information can be generated, for instance, by the state information generation module 108 illustrated in FIG. 1, or by any other appropriate module or software. Additionally, the updated state information may also be stored—in some cases for a limited time (i.e., for the timeout value associated with the local memory)—at the server. In those cases, a response from the client or other user interaction within the limited time period may allow the hosted application to retrieve the state information from local memory, thus providing, in some instances, a faster processing of the request.

At 232, the server and/or hosted application sends the prepared response to the application associated with the request of 202, including the updated state information and any data included in the response. Again, particularly when the entire hosted application is to be run in a stateless manner, sending the entirety of the updated state information will allow any subsequent request related to the current response to be processed and handled in the correct hosted application state. As illustrated at 234, the server ends and closes the hosted application after the response is sent to the client and/or client application. In some embodiments, the hosted application may be kept open for a predetermined or dynamic period of time after the response is sent at 232, allowing for any short-term interactions with the client to be handled in a stateful manner. The period of time may be a set timeout value associated with a web-based application, such as a game, bank website, or any other appropriate application, such that a reasonable time value associated with the known or expected interactions is provided. In those instances, the client, if acting or executing within normal parameters and expected time periods, can interact with the hosted application without the need to reinitialize the application after every request. In other instances, such as those where requests are received at relatively discrete time periods, the server may end the hosted application immediately upon sending the response at 232. The particular default values associated with the execution of method 200 can be amended or varied according to the variables and specifications of the hosted application and its particular environment. In still other instances, the hosted application may not be ended or closed at all before receiving the next request, allowing a hosted application that began in a stateless manner to continue in a stateful manner without the need to reinitialize the hosted application after the second or later request.

A key advantage of illustrated method 200 is that after the response is generated and sent to the client application, either at 220 in a stateful execution or at 232 in a stateless execution, the flowchart returns to 202 each time a new request associated with the hosted application's execution is received. In other words, each request may be treated differently by the server and/or hosted application. For example, the first set of requests and responses may be handled by the hosted application in a stateless way, while one or more of the later requests and responses are then handled in a stateful way. An example of operation occurs where a single hosted application is used for the related interactions of multiple users or clients. The first client may send several requests and receive several responses, each changing the state of the hosted applications. Based on the related (and in some cases, closely-timed) requests of the first client, the hosted application may be executed in a stateful manner to allow for, in this instance, more efficient processing of the requests. After the final request of the first client (and response of the hosted application), the final response, such as a request in the form of a specific URL that includes the updated state information, may be provided by the first client or user to a related second client or user (e.g., via email, instant messaging, or other communication method). Because the second client may not send an additional request within the timeout period of the web application, or because the end of the first client's session effectively ends the particular instance of the hosted application, the hosted application may not be initialized for the second client's request. Thus, later iterations of method 200 may comprise the requests of a second user disparate from the first, such that method 200 is contemplated to be effective for use among a plurality of users/clients. A new iteration from the second client includes a request providing the state information associated with the first client's final request and response, such that the hosted application can process the new request in accordance with the first client's final state information, thus allowing the hosted application to begin with the second client where it had left off with the first client.

FIG. 2B is a flowchart illustrating another example implementation of method 240 for providing stateful execution of stateless applications in a substantially transparent way from the perspective of the server executing the hosted application. Similar to FIG. 2A, and for clarity of presentation, the description that follows generally describes method 240 in the context of environment 100 illustrated in FIG. 1. However, it will be understood that method 240 may alternatively be performed by any other suitable system, environment, or combination of systems and environments, as appropriate.

At 242, the server receives an initial request from a client application associated with a hosted application stored and executed at the server. In some instances, the initial request from a client application may be received from a web browser representing the client application. Further, the initial request may be received via a network (e.g., network 132 of FIG. 1), where the initial (and subsequent) requests are represented in the form of a hypertext transfer protocol (HTTP) request. It will be understood that any other suitable request may also be used and is considered herein.

As in FIG. 2A, the hosted application can be considered a web-based application, accessible via a connection to the Internet, to a private intranet connection, or any other suitable connection, that allows for interaction with the client application (or web browser) and the various HTTP requests and responses. Additionally, the hosted application may be associated with a particular URL, such that the initially received request is directed to that particular URL, and is intended to initiate and/or execute the associated hosted application.

At 244, the server initializes an instance of the hosted application. It should be noted that 244 may be performed regardless of whether later executions of the hosted application are to be run statelessly or statefully. In other words, the first or initial request to the hosted application is the same for both state full and stateless applications, that is, both initialize the hosted application as interaction first begins.

Once the instance of the hosted application has been initialized at 244, method 240 continues at 246, where the server determines whether the hosted application is to be initially run statelessly or statefully. In some instances this determination may be based on whether or not each component associated with the hosted application is capable of stateless execution. In some embodiments, if one or more components of the hosted application are not enabled for— or at the time of the request, capable of—stateless execution, then the server may determine that the hosted application cannot be used in a stateless mode. In other embodiments, however, the hosted application may be capable of executing a subset of its components in a stateful manner while still executing other associated components to be executed in a stateless manner. Still further, even though a hosted application may be capable of stateless execution, the server may still determine whether the requested hosted application is to actually be run in a stateful or stateless manner. In the illustrated environment of FIG. 1, the determination of stateful or stateless execution is made by the state-type determination module 105 embedded within the hosted application 114. As described at 206 of FIG. 2A, the server's determination of whether the hosted application is to be executed statefully or statelessly may be based on any number of potential variables or considerations. Still further, the determination of 246 may initially be for the hosted application to be executed statelessly, while later iterations of method 240 for the same hosted application determine that the execution should be stateful for some interactions and/or remain or revert to stateless for others.

If the server determines at 246 that the hosted application is to be run statelessly, then method 240 continues at 248. At 248, the server and/or hosted application generates an initial response to the initial request, where the initial response includes the first set of state information generated during the initialization of the hosted application at 244. In some instances, the generation of the initial response will require some processing of the hosted application to occur. In those instances, the actions of 248 can include the steps for the server and/or hosted application to process the initial request prior to or concurrently with generating the initial response. Once the response is generated, method 240 continues at 252.

However, if the server and/or hosted application determine that the application is to initially run in a stateful manner, the initial request may be processed by the hosted application, and the first set of state information generated by that processing may be cached within the server for later use at 250. For example in the illustrated environment 100 of FIG. 1, any such state information associated with a stateful execution of the hosted application may be stored within the set of cached state information 126 of FIG. 1. Concurrently with or subsequent to the caching of the initial set of state information, the hosted application and/or server generates the initial response to the client application, also at 250. Once complete, method 240 continues at 252.

In either instance, method 240 continues at 252, where the initial response, generated either for a stateful or stateless mode of execution, is sent to the client application in response to the initial request. At 254, method 240 determines whether or not the initial determination of 246 was to run the application in a stateful or stateless manner. If the application was to be run statelessly, method 240 continues at 256 where the hosted application is ended. As described at 234 of method 200, the server ends and closes the hosted application after any response is sent during a stateless execution of the hosted application is sent to the client and/or client application. As previously described, in some embodiments the hosted application may be kept open and operating for a predetermined or dynamic period of time after the response is sent at 252, allowing for any short-term or quick interactions with the client or client application to be handled in a stateful manner. A description of such considerations in alternative embodiments is considered with regard to 234 of FIG. 2A. The time for which the hosted application may continue operating after sending the response may be a set timeout value associated with a web-based application or, in other instances, based on an dynamic determination of known or predetermined parameters associated with client interactions. The specific settings associated with ending the hosted application at 256 may be modified for different applications, different interactions, and different embodiments, each based on the expected or intended use of the hosted application and the interaction with the client application. Once the hosted application has been closed and/or ended, method 240 continues at 258.

At 258, the hosted application receives a new request from the client application associated with the hosted application in response to, or in the series of associated requests and responses related to, the initial request and response. After the new request has been received method 240 moves to the determination of 260, wherein it is determined whether the new request to be processed statelessly or statefully. Generally, this determination may be made based upon the received new request. If the request itself includes the set of previous state information associated with the last response (i.e., a response generated for stateless execution of the hosted application), the server and/or hosted application may determine that the new request should be processed as a stateless request. In some instances, however, even though the new request includes the updated state information associated with a previous response, the hosted application and/or the server may determine that the situation calls for a stateful mode of execution. As previously mentioned, this may be based on the fact that the hosted application has not been ended when the new request is received, such that the correct state is maintained in the non-ended instance of the hosted application. Similar to the above, if the new request from the client application associated with the hosted application does not include a set of the current state information, the hosted application and/or server can determine that the new request is to be processed statefully.

If it is determined that the new request is to be processed statelessly, method 240 continues at 262 where the hosted application is reinitialized, or a new instance of the hosted application is initialized, into the proper state defined by the set of state information included within the new request. If, however, it is determined that the new request is processed statefully, then method 240 moves to 264 where the hosted application and/or server retrieves the set of cached state information associated with the new request. In other words, the hosted application and/or the server accesses the set of cached information 126 illustrated in FIG. 1, and places the hosted application into the state corresponding to the retrieved state. In some instance, the hosted application may already be in the correct state such that the cached state information need not be retrieved prior to continuing method 240 at 266.

Once the state information associated with the new request has been retrieved, the new request is processed by the hosted application and/or server at 266. Generally, processing the new request comprises performing the requested actions or events associated with the received request based on the hosted application's appropriate current state, defined either with the request in the stateless execution or from the set of cached state information associated with the stateful execution. This step is performed similarly for both modes of execution.

Continuing at 268, method 240 determines whether or not the next interaction with the hosted application is to be run statelessly. In many instances, the determination of 268 will use the same criteria used to determine whether the application is to initially be run statelessly as described with regard to the determination of 246. It should be noted, regardless of whether the initial or previous interactions were performed statelessly or not, each subsequent determination at 268 can be made independently of those previous interactions. For example, where the determination of whether or not the application is run statelessly is based on the current runtime environment of the hosted application and/or server (e.g., CPU load, available memory, speed of network connection, type of request, particular client interacting with hosted application, etc.), each determination at 268 becomes a determination at least partially, if not entirely, independent of previous interactions. In other instances, the hosted application may have a defined order of operations, such that the operations themselves allow the hosed application to determine whether the next interaction is best operated in a stateful or stateless manner. Still further, a combination of a survey and analysis of the current runtime environment along with an understanding of the current and future operation of the hosted application can indicate whether or not the appropriate execution for the next interaction is stateful or stateless. In still other instances, the determination may be explicitly defined by the request received at 258, whereby the user associated with the client application manually selects the type of execution and such selection is included with the request. As previously described, the availability of dynamic determinations of the type of execution to be enacted in future interactions allows developers to provide applications capable of performing in either mode and providing the server or hosted application with the ability to determine the most efficient and/or appropriate method of operation during runtime.

If 268 determines that the next interaction is to be performed statelessly, method 240 continues at 270, where similar to 248, the hosted application generates a new response to the client application that includes or embeds an updated set of state information based on the hosted application state after processing the previous request at 266. Alternatively, if the next interaction is to be run statefully, method 240 continues at 272 where the updated set of state information is cached at the server (or elsewhere), and a new response to be sent to the client application is generated. Generally, in the stateful execution mode no state information will be included with or passed with the new response. However, in some cases responses for stateful execution may include the state information for potential use in a stateless execution should the state information be lost, erased, or otherwise become unavailable.

Once the new response has been generated at either 270 or 272, the hosted application sends the new response to the client application at 274. Once the new response is sent, method 240 returns to 254, where the hosted application and/or server determines whether or not the hosted application is to be run statelessly at 268. If the hosted application and/or server determine that the next interaction is to be run statelessly, then method 240 moves to 256 or the hosted application is intended as it is with other stateless executions. Alternatively, should the determination of 268 found that the next interaction should be a stateful execution, method 240 continues at 258 to await a new request from the client application.

As illustrated in FIG. 2B, any number of request and response pairs may be performed using method 240, with various interactions between the client application and the hosted application being performed both in a stateful and stateless method, determined according to either dynamic criteria analyzed by the hosted application and/or the server, based on the choreography of the hosted application itself, or by manual indication from a user associated with the client. In fact, the operations of a particular hosted application in both stateless and stateful executions are generally identical except for a few additional steps associated with the stateless execution mode—the re-initializing of the hosted application when a new request is received and the ending/closing of the hosted application once the new response has been sent. In other words, the additional steps for stateless execution may simply be omitted in instances where the application is to be executed statefully. The "normal" steps of the stateful execution can merely be extended with the additional stateless execution steps to perform any operations of the application without causing a significant difference to the operations of the hosted application from a runtime point of view. Instead, factors such as system performance and other runtime conditions or criteria can be analyzed to appropriately determine whether a stateful or stateless execution is more efficient or appropriate, without requiring the hosted application to be run in a manner much different than it would otherwise run without such options.

Figure 7:
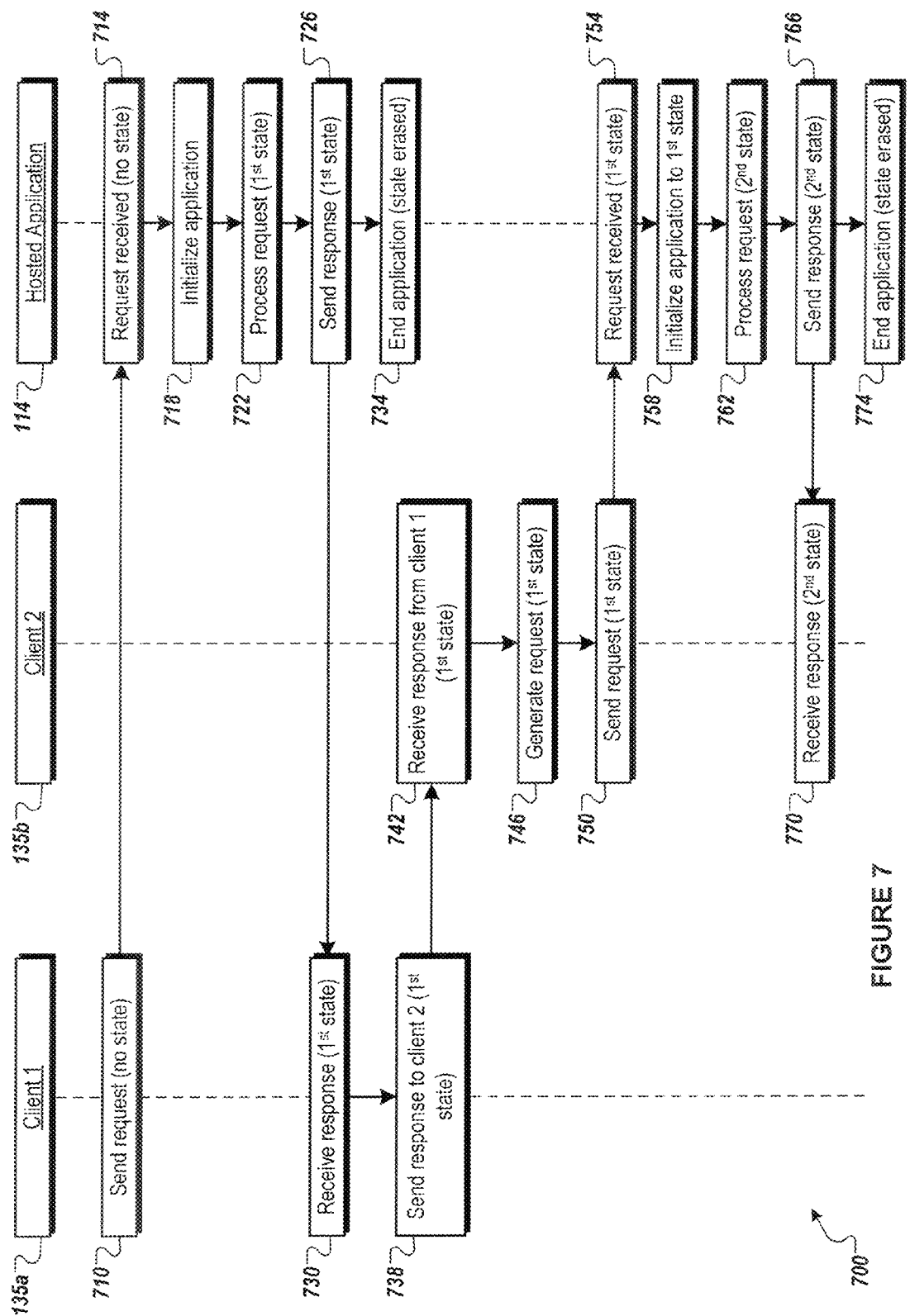
FIG. 7 is an example signaling and flow diagram illustrating one possible interaction between multiple clients interacting with a single hosted application, using the stateless execution mode of the hosted application to allow multiple clients to maintain consistent states for related interactions with the hosted application.

FIG. 7 provides an example signaling and flow diagram illustrating such interaction of the hosted application with multiple clients, in this example allowing two clients to maintain a consistent state through related interactions with the hosted application. For explanatory purposes, the example of a web-based chess application will be used in describing the diagram 700 of FIG. 7, although any other suitable hosted application or interaction can be used. Additionally, client 135*a*, client 135*b*, and hosted application 114 of FIG. 1 will be used for illustration purposes.

At 710, client 1 (135*a*) generates and sends a first request to the hosted application 114 to perform a first action. In this example, the request of 710 can be an opening move in a chess match between a first user associated with client 1 (135*a*) and a second user associated with client 2 (135*b*). As this is the opening move of the match, the request may not contain any particular state information with regard to previous moves, so that there is one initial state of the hosted application 114 (i.e., the game is begun with the board's pieces at their opening positions). In other instances, the first request may not be a human action such as an opening move, but instead more of a technical action such as retrieving the initial chess board, and thus starting a new game. In those instances, the first human action, such as the opening move, may count or be represented as the second request on a technical level. For example, on an HTTP level, the first request to start the game would be similar or analogous to a GET request to retrieve a form (or here, the chess board), and the following POST request would be the submission of the form filled by the user (or here, the opening move). While these and other examples are considered here, the first action as illustrated in FIG. 7 will represent the opening move of the match, with the understanding that prior to making said move, the initial chess board will have been retrieved.

At 714, the hosted application 114 receives the request from client 1 (135*a*) associated with the opening move. In this particular instance, the hosted application 114 is initialized, or started, at 718, in order to respond to the request. In some instances, the hosted application 114 may already be initialized, such that the step at 718 may be omitted. At 722, the hosted application 114 executes or processes the request from client 1 (135*a*) in order to generate a first state of the hosted application 114. In this example, the first state of the hosted application 114 may represent the new placement of the pieces on the chess board. At 726, the hosted application 114 sends a response, along with the set of first state information, back to client 1 (135*a*). In this instance, the response is generated and sent as a URL, with the hosted application's web address as the first part of the response, and with the specific positions of the chess pieces (i.e., the first state of the application) encoded within or attached to the end of the URL (e.g., "http://www.chessapplication/chess#3Q4%2F6Q1%22F2q5 . . . ", where the portion of the URL after the "#" represents the first set of state information). For the purposes of this example the hosted application 114 is being run in a stateless mode, and thus, after the response is sent at 726, the hosted application 114 is ended or closed at 734, and all previous state information is deleted or erased.

At 730, client 1 (135*a*) receives the response from the hosted application 114, along with the associated first set of state information. Instead of sending another request to the hosted application 114, client 1 (135*a*) sends the response (i.e., the specific URL received from the hosted application 114) to client 2 (135*b*) at 738 so that client 2 can make a countering move in the example chess match. In general, the entire response received by client 1 (135*a*) will be sent to client 2 (135*b*), including both the URL associated with the response, as well as any other information associated with the response, such as additional HTML information, as well as any other parameters passed outside the URL itself. In instances where only the URL is sent, client 2 (135*b*) may need to request the server with the appropriate URL to retrieve the board, and then send an additional request to display the current form of the board. If the content is not passed to client 2 (135*b*) from client 1 (135*a*), then client 2 (135*b*) retrieves the remaining content of the response not included within the URL prior to continuing its interaction with the hosted application.

At 742, client 2 (135*b*) receives the response from client 1 (135*a*). After reviewing the response and current state information (i.e., client 1's previous move), client 2 (135*b*) generates a new request based on the first set of state information at 746 (i.e., client 2's chosen move), and subsequently sends the request, which includes the first set of state information, to the hosted application 114 at 750.

The hosted application 114 receives client 2's request at 754, and at 758, is initialized to the first state as included within the request from client 2. At 762, the hosted application 114 executes and/or processes the new request from client 2 (135*b*), generating a second state of the hosted application 114 based on the result of the request's execution. In the present example, the second state represents the state of the hosted application 114 after both clients have made a single move. At 766, the hosted application 114 generates and sends a response, including information or data defining the second state, to client 2 (135*b*). Again, because the hosted application 114 is being run in a stateless mode for this example, the hosted application 114 is ended or closed at 774 such that all previous state information is deleted or erased.

At 770, client 2 (135*b*) receives the response to its request from the hosted application 114, along with information defining the updated second state (i.e., an updated URL embedding the current state of the chess board prior to the next move of client 1 (135*a*)). Similar interactions can be taken between the clients and hosted applications as the chess game continues and until the hosted application completes it purposes. Importantly, the steps of FIG. 7 illustrate the ability of the present disclosure to perform related operations of the hosted application 114 using any client or client application. By doing so, the stateless capabilities of a particular application allow increased scalability and usage without the need to save state information at the server associated with the hosted application 114.

Figure 3:
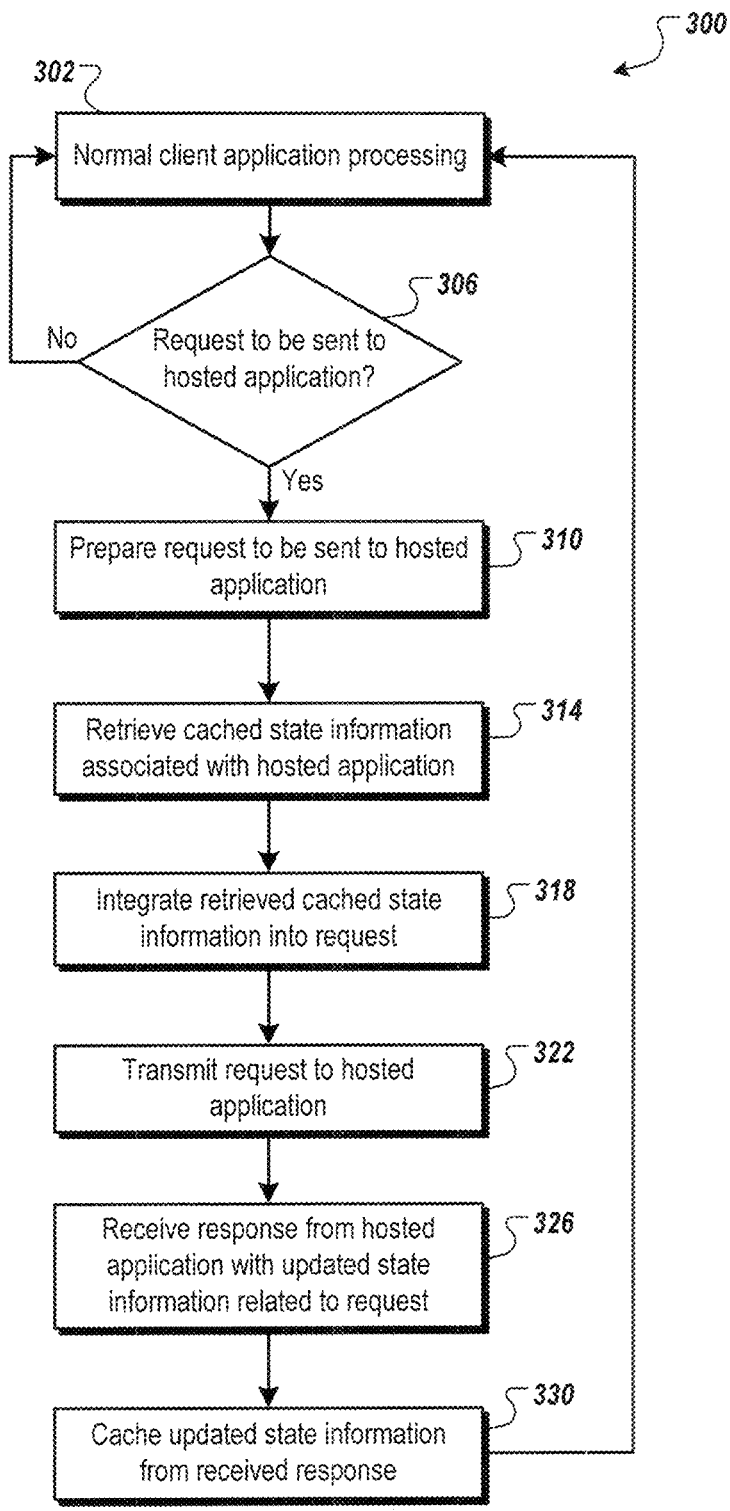
FIG. 3 is a flowchart illustrating an example computer process for providing stateful execution of stateless applications from the perspective of a client using an appropriate system, such as the system described in FIG. 1.

FIG. 3 is a flowchart illustrating an example computer process for providing stateful execution of stateless applications in a substantially transparent way, specifically from the perspective of a client using an appropriate system, such as the system described in FIG. 1. For clarity of presentation, the description that follows generally describes method 300 in the context of environment 100 illustrated in FIG. 1. However, it will be understood that method 300 may alternatively be performed by any other suitable system, environment, or combination of systems and environments as appropriate. Specifically, FIG. 3 illustrates how a client's interaction with a particular hosted application capable of both stateful and stateless operations can be identical, such that the client in question is generally unconcerned with which state the particular hosted application is being executed. Additionally, because the stateless and stateful modes of operation are extremely similar, not only is the dynamic switching nearly transparent for users of the client application, but application developers are also provided with near-transparency in creating and testing such statelessenabled hosted applications.

At 302, the client (or as illustrated, the client application) performs its normal client application processing. This may include any actions which are performed at the client, particularly those performed without interaction with the hosted application. In some examples, the client application may be a standalone application that occasionally interacts with the hosted application, a web browser capable of accessing the hosted application when so directed, or a specifically-designed agent or application meant only for use with the hosted application. Thus, the normal client processing and operations of 302 may be any such operations associated with the particular client application. At 306, the client application determines whether a particular request is to be sent to the hosted application in anticipation of client interaction with the same. If no requests are to be sent by the client application, method 300 returns to its normal processing at 302. However, if a request is to be sent, method 300 continues at 310.

At 310, the client application prepares the request to be sent to the hosted application. In many instances, this may include the client application receiving instructions from the associated client or user, and preparing that information for transmission to and handling by the hosted application. In some instance, the request to be prepared at 310 is one in a series of previous requests, such that the current request is a response to a response previously received from the hosted application. In the current example, the client application treats all hosted applications as though they are being executed in a stateless manner. Thus, each request prepared by the client application in method 300 will include the previous state information received or maintained at the client during previous interactions with the hosted application.

At 314 the client application identifies the hosted application to which the request is to be sent, and retrieves any stored or cached state information associated with the identified hosted application. If the client application has not previously interacted with the hosted application, no state information may be stored at the client. Additionally, previous state information stored at the client may be associated with a particular timeout value, such that the information is deleted or archived after the timeout period has been exceeded. In still other instances, previous state information may be stored remote from the client, such that the client application may need to access one or more remote storage locations to retrieve the previous (or current) state information associated with the hosted application and the prepared request.

Once the information has been retrieved, the client application integrates at least the most recent state information into the request prepared at 310. As previously described, this may include embedding or concatenating certain information within or to a URL associated with the request to be sent to the hosted application, allowing the hosted application to merely parse through the received URL to determine the current state in which the hosted application should be placed. Alternatively, the current state information may be part of an HTTP request representing the request prepared at 310 that is to be sent from the client application to the hosted application. In still other implementations, the most current state information from the client's cached state information may be sent separately from the request, either by the client application or by a separate agent, program, or other software application associated with the client. Once the current state information has been retrieved and integrated into (or included with) the prepared request at 318, the client application transmits the request to the hosted application at 322. In the illustrated example of FIG. 1, the request may be sent via the wireline or wireless connections of the network 132.

After transmitting the request, the client application waits for a response from the hosted application until it is received at 326. Included with the response is the updated state information associated with the hosted application after the previous request was processed and executed. The received state information is an important portion of the response, as it can allow the client application to later place the hosted application into the proper state when additional requests are sent, particularly when the hosted application does not store or maintain the state information of its various client interactions. At 330, the client application then analyzes the received response to retrieve the updated state information, and caches the updated state information at a specified memory location within or associated with the client. As illustrated in FIG. 1, the updated state information can be stored with the set of cached state information 150 associated with the hosted application 114. The information can be made readily available to the client application for any future interactions with the hosted application. In some instances, the updated state information may overwrite the previous state information. In others, the updated state information may be stored concurrently with the previous state information, allowing the client application to return to previous interactions with the hosted application if the user so desires.

Once the current state information is cached, method 300 returns to 302, and the client application returns to its normal processing and operations. As previously described, the current state information may be sent to other clients and/or client applications if the hosted application is one for which multiple users/clients are involved. It should be understood that even though the client application always includes the cached set of current state information with every request, the hosted application may elect to use its own stored information (where it is available) to process and respond to the request. However, by including the state information with every request, the client application ensures that the hosted application, whether or not it is capable of stateful execution, will have information defining the current state in which the request should be processed. Additionally, by always including the state information, the determination of whether the hosted application is to be run in a stateful or stateless manner is removed from the clients themselves, and instead is determined by the hosted application or its associated server. In that manner, the hosted application can dynamically switch between stateful and stateless execution for each and every request, with the specific type of execution being transparent to the client application. In many implementations, the only instances where the determination between stateful and stateless execution is known to the client application is when the client application explicitly requests or requires that the hosted application be executed in a particular manner. In other words, the advantages of both stateless and stateful execution modes can be realized in a system without requiring the client to be concerned with which mode should be used for any request.

Figure 4B:
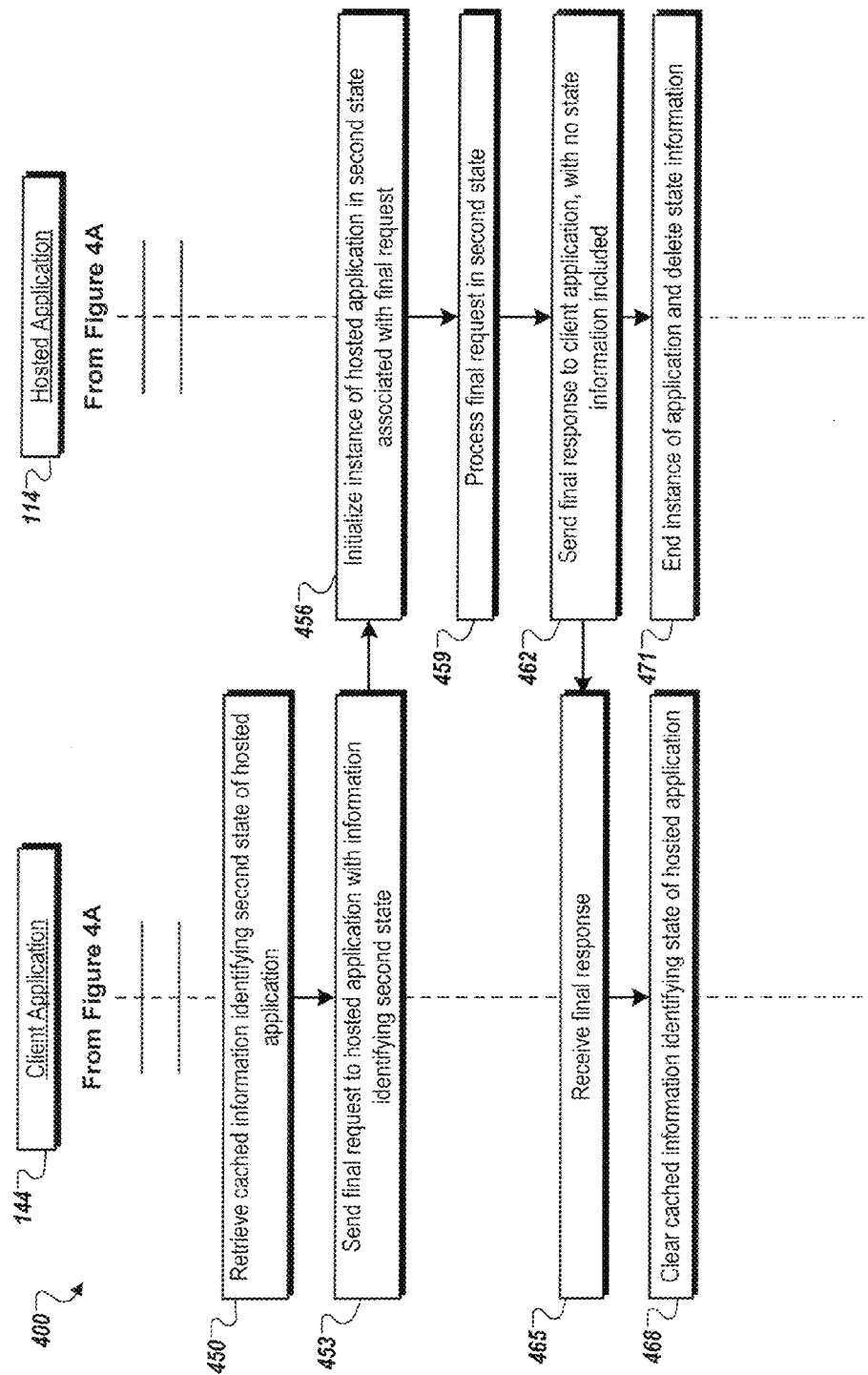

FIGS. 4A-B are signaling and flow diagrams (illustrating portions of methods 200 and 300) that describe the interactions between a client and a hosted application, where the hosted application is being run solely in a stateless manner in accordance with the example environment of FIG. 1. Specifically, the entities involved in the interactions of method 400 are elements from the illustrated environment of FIG. 1—client application 144 (of client 135a) and hosted application 114 (of server 102). Although method 400 is described in terms of the illustrated environment of FIG. 1, it should be understood that any other suitable system or environment may also be used to perform method 400. Still further, some portions of the individual operations of both the client application 144 and the hosted application 114 have been omitted for ease of description. Any relevant or necessary operations and actions for proper execution of both the client application 144 and the hosted application 114 may be considered as included herewith, regardless of whether they are explicitly described.

Beginning at box 403 of FIG. 4A, the client application 144 generates and sends an initial, or first, request to the hosted application 114. Because this is the initial request, no state information associated with the current client application-hosted application interaction is available. Thus, the first request can be considered to include only a request to initialize the hosted application 114 and the client application's first request for the hosted application 114 to perform some operations.

At box 406, the hosted application 114 (via the operations and components of server 102), receives the first request, initializes a new instance of the hosted application 114 in response thereto, and processes the first request (i.e., performs the operations or events included in the first request). Once the first request has been appropriately processed, the hosted application 114 generates and sends its first response to the client application 144 at 409. As has been described, the hosted application 114 analyzes its state after its processing of the first request, and generates an appropriate and corresponding set of information describing that state to be included with its response. Because this is the first response to the client application 144, the current state after processing the first request can be considered the first state of the hosted application 114. As noted, that state is included with the first response and provided to the client application 144 at 409.

At box 412, the client application 144 receives and processes the first response, while at box 415, the client application 144 caches, or stores, the information identifying the first state of the hosted application 114 received with the first response. Future requests sent by the client application 144 will retrieve this cached state information to ensure that the hosted application 114 is placed in the proper state prior to any future instructions and requests being processed. In this manner, the client application 144 and the hosted application 114 will be kept consistent with one another as additional interactions occur. Returning to the hosted application 114, FIG. 4A illustrates that after the first response is sent to the client application 144, the particular instance of the hosted application 114 is ended or closed, and any state information regarding the interaction is deleted at box 418. This step occurs because, as previously noted, the hosted application 114 in the current example is being executed in a stateless manner such that no state information is maintained at the server 102, and each request received from the client application 144 provides the current state information to which the hosted application 114 is to be initialized.

After boxes 415 and 418, any amount of time may pass before method 400 continues. In some instances, the nature of the hosted application 114 may require or suggest that a follow-up request will be sent from the client application 144 a relatively short time after the first response is received. In other instances, the hosted application 114 may be such that additional requests may only occur at a relatively distant time from the client application's receipt of the first response. In other words, the time between the operations of boxes 415 and 421 can vary greatly according to the purpose and interactions of specific implementations, environments, and clients, with each of the various permutations being considered in the present disclosure. In either event, the client 135 maintains the state information, and the hosted application 114 is free to perform other operations, including the same operations, with other clients 135 in the meantime. For instance, method 400 merely contemplates the hosted application's 114 interactions with a single client 135 and client application 144, whereas many hosted applications 114 can be used for interactions with multiple clients 135 and client applications 144 during concurrent time periods, in some instances with certain operations being performed simultaneously or almost-simultaneously with those of method 400.

Moving to box 421, the client application 144 retrieves the set of cached first state information maintained by the client 135 (i.e., the set of cached state information 150 of FIG. 1) in preparing the second request. Along with the retrieval of the current state information, the client application 144 may integrate the current state information into the second request such that information identifying or defining the first state of the hosted application 114 is included in the second request. Example methods for including this state information are described in FIG. 3, and any suitable method can be used here. At box 424, the client application 144 sends the second request, which includes the second state information, to the hosted application 114.

At box 427, the hosted application 114 receives the second request and initializes an instance of the hosted application 114 into the first state identified in the received second request. The initialization, or starting, of the hosted application 114 may be a two-part process—initialization of an instance of the hosted application 114 and subsequently putting the hosted application 114 into the first state—or a single process where initializing the hosted application 114 includes placing the hosted application 114 in the first state of the request. Other suitable methods of performing the same may also be used. Once the instance of the hosted application 114 is initialized to its first state, the hosted application 114 processes the second request at box 430. By processing the second request in the first state, the hosted application 114 generates a response to the request (i.e., the second response) and the hosted application 114 is placed into a second state. When the second response is generated, the information defining the second state is included with or embedded within the second response. Then, at box 433, the second response, including the integrated second state information, is sent to the client application 144 by the hosted application 114. Once the second response is sent, the hosted application 114 again ends and erases or deletes any state information associated with the current interaction at box 442.

Similar to the processing of the first response, the client application 144 receives the second response at box 436 and parses/retrieves that state information included with the second response defining the second state of the hosted application 114. Once retrieved, information defining the second state of the hosted application 114 is stored or cached at the client 135 by the client application 144 at box 439. Once the information is cached, method 400 waits until a third (and, as illustrated, final) request is to be sent before continuing.

As illustrated, at box 450 (and similar to box 421) the client application 144 retrieves the set of cached state information defining the second state of the hosted application 114 in preparing the third and final request. Along with the retrieval of the current state information, the client application 144 may integrate the current state information into the second request such that information identifying or defining the first state of the hosted application 114 is included in the second request. At box 453, the client application 144 sends the final request, which includes the second state information, to the hosted application 114.

At box 456 (similar to box 427), the hosted application 114 receives the final request and initializes an instance of the hosted application 114 into the second state as identified in the received second request. Once the instance of the hosted application 114 is initialized to its second state, the hosted application 114 processes the third and final request at box 459. By processing the final request in the third state, the hosted application 114 generates its final response to the third request. Being the final response, the operations of the hosted application 114 associated with the current interactions are known to be at an end. Thus, the final response generated by the hosted application 114 responds to the final request, but does not include any state information (other than the information normally included in the response to the request). At box 462, the hosted application 114 sends the final response to the client application 114. Again, once the final response is sent, the instance of the hosted application 114 ends and any state information remaining is erased or deleted at box 471.

At 465, the client application 144 receives and processes the final response from the client application 114. Because no further interaction is necessary, and the current interaction is considered completed, the client application 144 may clear the cached state information associated with the current interaction of method 400 from its memory at box 468. Alternatively, the client application 144 can again elect to maintain all of its previous state information to allow for later use of previous states if alternative scenarios or requests from previous information is desired.

While FIGS. 4A-B describe an example of the hosted application 114 being run solely in its stateless mode, FIGS. 5A-B illustrate an example signal and flow diagram of the hosted application 114 dynamically switching between stateless and stateful execution during its interactions with the client application 144 in method 500. Again, although method 500 is described in terms of the illustrated environment of FIG. 1, it should be understood that any other suitable system or environment may also be used to perform method 500. Further, for purposes of description, some portions of methods 200 and 300 (from which portions of method 500 use) have been omitted. Those portions, as well as others not described but understood by one of skill in the art, are to be considered suitable alternatives for use with or instead of the foregoing.

Beginning at box 503, the client application 144 prepares and sends an initial, or first request, to the hosted application 114. As the initial request for the interaction between the client application 144 and the hosted application 114, no state is available for the client application 144 to provide in its request. At box 506, the hosted application 114 (or server 102) receives the first request, and initializes an instance of the hosted application 114 for use in processing the first request. At box 509, the first request is processed, and in response, the hosted application 114 generates and sends a first response to the client application 144. As previously described, in generating the first response, the hosted application 114 (or a component thereof) analyzes the hosted application 114 and generates a corresponding set of information describing the exact state the hosted application 114 was in after processing the first request and while generating the first response. As this is the first response to the client application 144, the current state after processing the first request can be considered the first state of the hosted application 114. As noted, that state is included with or embedded within the first response provided to the client application 144 at 509.

Unlike the example of FIGS. 4A-B, the hosted application 114 of FIGS. 5A-B is set to perform in either a stateless or stateful manner. Thus, at box 518, the hosted application 114 stores the set of information identifying and defining its first state locally, as well as including it with the first response. In some instances, this storage of state information may be associated with a certain timeout value, thus maintaining the state information for only a short period of time. Alternatively, the state information may be kept indefinitely, and only replaced when newer information from the current interaction is received. Still further, the hosted application 114 may also store state information from all interactions in a permanent (or relatively permanent) location. Additional suitable alternatives are contemplated herein, but in any event, the hosted application 114, at least for some period of time, does not erase or delete, and instead maintains, its state information after sending the first response.

The client application 144 of FIGS. 5A-B, however, performs the same operations as those described in FIGS. 4A-B, and receives the first response, along with the information identifying the first state of the hosted application 114, at box 512, and subsequently caches, or stores, the first state information at box 515.

Moving to box 521, the client application 144 retrieves the set of cached first state information stored by the client 135 in preparation of the second request. The client application 144 may integrate the current state information into the second request such that information identifying or defining the first state of the hosted application 114 is included in the second request. At box 524 (identical to box 424 of method 400), the client application 144 sends the second request, which includes the second state information, to the hosted application 114.

At box 527, the hosted application 114 determines that the hosted application 114 is running in a stateful mode. In some instances, this determination is made based on an analysis of the time between the second request and the first response (i.e., whether the timeout value of the state information stored by the hosted application 114 has been exceeded), a determination of the current processing load being placed on the server 102 associated with the hosted application 114 (e.g., a determination of whether the number of clients accessing the hosted application 114 exceeds a particular threshold, or whether the CPU load on the server 102 meets certain criteria), explicit instructions received with the second request, or any other appropriate method of determining whether a stateless or stateful execution is to be used. For purposes of box 527, the hosted application 114 determines that a stateful execution is the proper mode of execution for the current request.

In response to that determination, the hosted application 114 retrieves the state information associated with the current interaction from the server 102, places the hosted application 114 into that state, and then processes the second request accordingly at box 530. In some instances, the hosted application 114 may need to be reinitialized prior to performing this step, while in others, the hosted application 114 may be ready to proceed without the need for initialization (e.g., when the second request follows from the client application 144 relatively shortly after the first response is sent from the hosted application 114). In either event, the second request is processed in the first state of the hosted application 114, and the second response is generated and sent to the client application 144 at box 533, along with information defining the state of the hosted application 114 after processing the second request (i.e., the hosted application's 114 second state). Similar to box 518, in addition to incorporating the second state information into (or including it with) the second response, at box 542 the hosted application 114 stores the information identifying the second state of the hosted application 114 at server 102 for potential future use.

At 536, the client application 144 receives the second response, processing the response to retrieve the information defining the second state of the hosted application 114. In a manner similar to box 515, the client application 144 caches the second state information included with the second response at box 539. Once the request is received and the second state information cached, the client application 144 waits until a new request is to generated.

Prior to box 546, the client application 144 determines that a third and final request is to be generated. In some instances, the determination that a request will be the final request will not be the client application's 144, but rather a server's or the hosted application's 114. For example, in a chess application, the hosted application 114 may determine that a game should be terminated due to a checkmate. In general, the hosted application's logic determines whether the interaction is to end, and thus, whether a certain response is the final response. In the current example, the client application 144 determines that the third request will be the final request, although in alternative examples the server and/or hosted application 114 may determine that the third request is to be the final request. At box 546, the client application 144 retrieves the set of cached state information defining the second state of the hosted application 114 in preparing the third and final request. The client application 144 integrates the current state information into or includes it with the generated second request. At box 550, the client application 144 sends the final request, which includes the information defining the second state, to the hosted application 114.

As described, the hosted application 114 in FIGS. 5A-B is capable of dynamically determining whether to operate in a stateful or stateless manner for each separate request. At 554, the hosted application 114 receives the third and final request from the client application 114, and determines that the hosted application 114 is to be run in a stateless mode. Again, this determination may be made based on any of the factors described with regard to box 527, as well as others suitable for the hosted application 114. In the current example, it will be understood that the timeout value was exceeded between the second response and the third (and final) request, such that the second state information has been erased at the server 102 and is not available to the hosted application 114. Based on this determination, the hosted application 114 (or server 102) initializes an instance of the hosted application 114, and using the set of second state information included with the third request, places the hosted application 114 into the appropriate second state at box 558. Once properly initialized, the hosted application 114 processes the third request in the appropriate state at box 562, generating an appropriate third (and final) response for the client application 144. Although described as the final request and the final response, the request sent at box 550 may instead merely represent one of many additional requests, such that additional iterations of the request/response activity are performed. However, in the illustrated instance, the hosted application 114 sends the third and final response to the client application 144 at box 566. Because the interaction between the client application 144 and the hosted application 114 is complete, no additional state information is necessary after the final response is generated. Thus, no state is included in the final response. Additionally, the instance of the hosted application 114 is ended and any relevant state information associated with the described interaction can be deleted at box 578. As previously noted, the hosted application 114 may elect to store the previous state information, although not illustrated as such here.

At 570, the client application 144 receives and processes the final response from the client application 114. Because no further interaction is necessary, and the current interaction is considered completed, the client application 144 may clear the cached state information associated with the current interaction of method 500 from its memory at box 574. Alternatively, the client application 144 can maintain its previous state information to allow for later use of previous states if alternative scenarios or requests from previous information are desired.

Although illustrated with only three requests sent from the client application 144 to the hosted application 114, it will be understood that the present disclosure includes systems where hundreds or more transaction occur between the client application 114 and the hosted application 144. Additionally, method 500 of FIGS. 5A-B can be combined with method 700 of FIG. 7, allowing for multiple clients or client applications to interact with a single hosted application 114. Still further, in some instances, multiple hosted applications 114 may be used to realize an enterprise application, such that the states relevant to each of the individual or different hosted applications 114 may be used in requests sent to the enterprise application. In yet another example, the hosted application 114 may be made up of a plurality of smaller components or applications, each individually performing the operations described in FIGS. 2-5A-B and 7, while each only making up a portion of the overall hosted application 114. For instance, some components may only be able to perform stateful executions, such that those components will never perform statelessly. However, other co-performing and related components may allow for stateless execution, such that the requests to and the responses from the hosted application 114 include state information for those components that are stateless-enabled, while the stateful-only components store their state information at the server 102. Any combination of such components and elements is considered by the above description. In one method, an application or component's state can be, similar to that described in the URL-based example, externalized from the application into a string-based representation of the state for each stateless component. Each stateless component may be associated with its own unique URL fragment or string representation, such that when loading the composite application, each component may retrieve its relative state prior to execution of the associated request.

Figure 6:
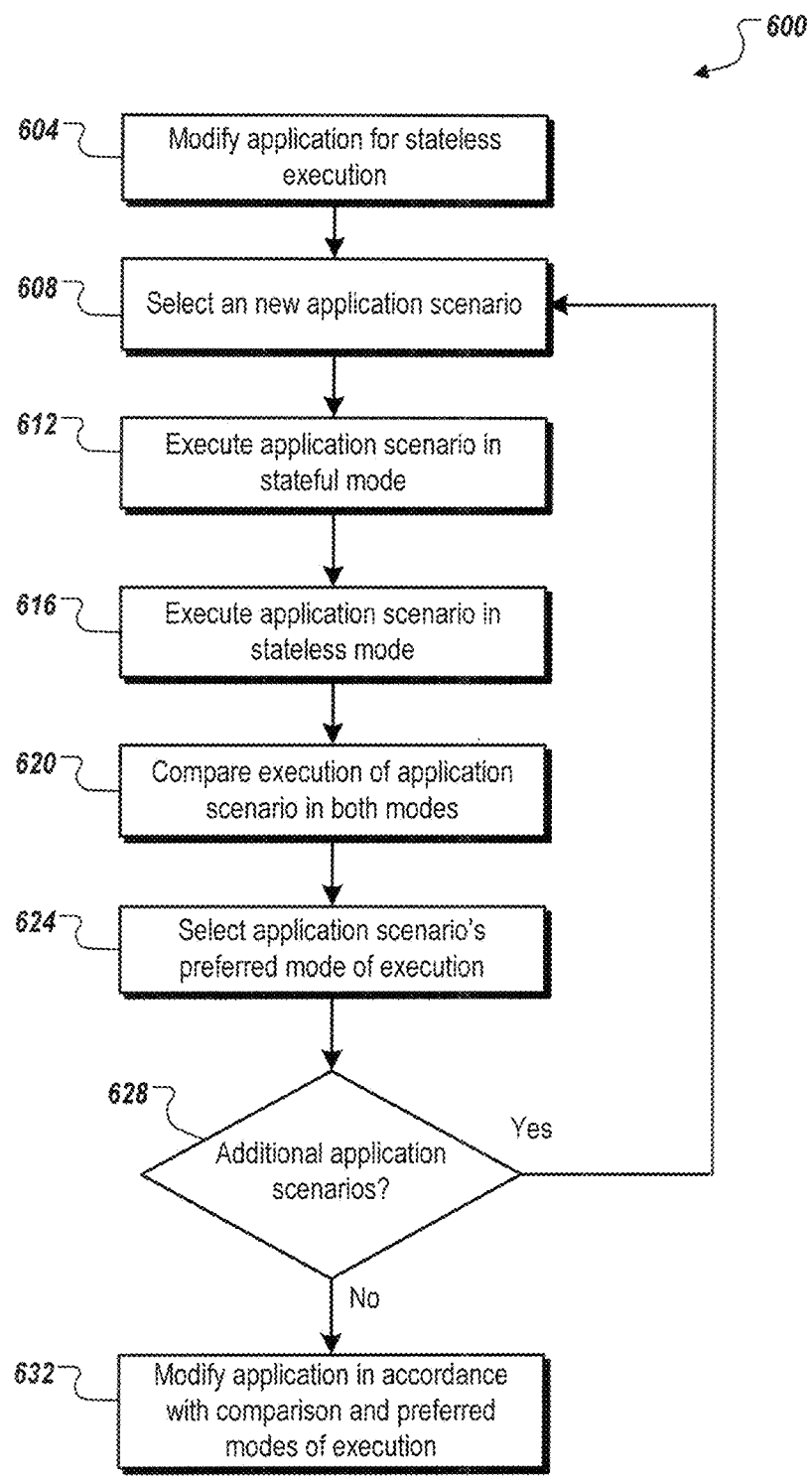
FIG. 6 is a flowchart illustrating an example computer process for determining the preferred mode of execution, either stateful or stateless, for various scenarios of the application scenario using an appropriate system, such as the system described in FIG. 1.

FIG. 6 is a flowchart illustrating an example method 600 for determining the preferred mode of execution, either stateful or stateless, for various scenarios associated with the hosted application. As previously discussed, both statelessly and statefully executed applications have their own respective advantages and disadvantages. Further, the advantages gained by one method may not outweigh its disadvantages. Thus, in addition to providing for the dynamic selection of stateless or stateful execution, the present disclosure also allows a method for developers to determine when certain types of execution are more suited for the task at hand, and to what degree a particular selection should be used.

Turning to 604 of FIG. 6, a previously stateful-only hosted application is modified such that it can now execute in a stateless mode as described above. In one method, the extension of a stateful application to perform statelessly may include the addition of several defined application programming interfaces (APIs) to perform certain methods to allow each hosted application to perform statelessly. For example, APIs can be used that determine whether a particular application or component supports a stateless execution model, to determine and/or generate a representation of an application's or component's state information, and to embed and read the current state from the requests and responses, such as from the URLs through which said requests and responses are sent. Using these APIs, as well as others, many stateful applications can be modified to perform statelessly. Once an application is capable of performing statelessly, the developer and the application itself have the option to decide whether a particular application or component will be run statelessly. In some instances, the need for additional memory may indicate that an application should be run statelessly (i.e., no state information stored in the server's memory), while in others, the need for faster execution may indicate the application should be run statefully (i.e., no initialization required for each request). In some instances, these decisions can be made dynamically by the application, while in others the applications can be manually selected to run in a certain mode, while in still other instances, developers may program certain characteristics and thresholds under which an application should be run in a certain mode, thereby allowing the application to determine, based on the runtime environment, which mode to execute. Steps 608-624 describe this testing procedure.

At 608, a known application scenario is selected. This application scenario may be the normal execution of the application, or a specific instance or exception under which the application may operate. At a minimum, the application scenario represents a certain situation in which the application may operate. At 612, the application developer or tester places the application into the selected scenario, either in normal operation or in a development environment, and manually elects to run the application scenario in its stateful manner. This may be done using a particular development kit (SDK) or by simply interacting with the application in order to place the application into the appropriate mode. For instance, in some development environments, stateless-enabled applications may be limited to stateful executions and vice versa, overriding any dynamically-based decision-making inherent to the application. As the application is executed, details and statistics regarding the performance of the application and the results on the application's runtime environment are recorded and analyzed for future use.

At 616, the application developer or tester places the application back into the selected scenario, but instead executes the application in its stateless mode. Again, the development or testing environment may allow the developer/tester to explicitly elect to run the application in its stateless mode of operation, while in other instances, the application may include user options of which mode in which to perform. Regardless of how the application is made to operate statelessly, again the details and statistics associated with the stateless performance of the application and the effects on the application's environment are recorded and analyzed for future use.

Once the application scenario is run in both the stateful and stateless modes of operation, the developer/tester compares the performance results associated with the two executions. If the stateful execution performs significantly more efficiently than the stateless execution, while only adding minimal memory overhead, the stateful execution may be advantageous. Conversely, if the stateful execution performs similar to or worse than the stateless execution, but the stateful execution utilizes statistically significant memory resources for its execution, stateless execution may be advantageous. Depending on the results of the comparison, the preferred mode of execution is selected at 624.

At 628, method 600 determines whether any additional, untested application scenarios remain. If additional scenarios exist, method 600 returns to 608, where a new application scenario is selected. If however, no additional scenarios remain for testing, then method 600 continues at 632, where the application itself may be modified according to the results of the various comparisons and selections of 620 and 624. For instance, certain application scenarios and their related programming may be modified such that the application, under normal circumstances, would perform the associated operations in the preferred mode of execution. Similarly, if certain conditions would arise that would shift the balance of preference from one mode to another, those characteristics may be included in the application's programming so that those exceptions or occurrences are handled correctly. By modifying the application accordingly, each application scenario can be maximized such that execution of the application is as efficient as possible. In some instances, the application may include a learning tool that allows all circumstances to be considered, and which itself can dynamically manipulate the various characteristics and thresholds in which a particular mode of execution is preferred. For example, if the amount of memory for storing state information increases, some application scenarios may be dynamically (or manually) modified in order to reflect the changes. Alternatively, a testing program can be used to continually perform the testing steps of method 600, modifying the preferred modes of execution as additional data is received. Still further, the testing program may be used to report to developers over a longer period of time to allow developers to reconsider the preferred mode of operation for certain application scenarios, where necessary.

Although this disclosure has been described in terms of certain implementations and generally associated methods, alterations and permutations of these implementations and methods will be apparent to those skilled in the art. For example, the actions described herein can be performed in a different order than as described and still achieve the desirable results. As one example, the processes depicted in the accompanying figures does not necessarily require the particular order shown, or sequential order, to achieve the desired results. In certain implementations, multitasking and parallel processing may be advantageous. Other variations are within the scope of the following claims.

What is claimed is:

1. A non-transitory computer program product for providing stateful execution of a stateless application, the computer program product comprising computer readable instructions embodied on tangible media and operable when executed to:
   receive a request with an application associated with the request, the request received from a client associated with the application and identifying at least one operation to be performed by the application, the request always including a set of state information regardless of the application's capability for stateful execution, the set of state information including the previous state information received or maintained at the client during previous interactions with the application, the previous state information associated with a timeout value used to delete or archive the previous state information after a period of time associated with the timeout value has been exceeded, and the state information used to identify a first state for the application to be initialized prior to executing the at least one operation;
   determine, using the application, if a first of the at least one operation of the request is to be executed by the application, the determination comprising a dynamically transparent selection between a stateless mode and a stateful mode based on, at least in part, runtime environment metrics concurrent with the requested execution of the at least one operation, a specific user behavior, speed of a network connection, processor resources, and type of a network;
   in response to the transparent selection of the stateless mode:

retrieve the set of state information from the request; and initialize the application to the state identified by the retrieved set of state information;

in response to the transparent selection of the stateful mode, set the application to a state identified by a locally-maintained set of stored state information separate from the set of state information included with the received request;

execute, using the application and based on the dynamic transparent selection between the stateless mode and the stateful mode, the operations identified in the received request;

generate, using the application and based on the dynamic transparent selection between the stateless mode and the stateful mode, a response to the client associated with the received request, the response comprising the results of the operations and a set of updated state information identifying a second state of the application as determined after the execution of the at least one operation; and terminate execution of the application and delete any state information regarding the interaction with the client based on the received request.

2. The computer program product of claim 1, wherein the request comprises a uniform resource locator (URL) associated with the application, the instructions identifying at least one operation to be performed by the application comprising a web-addressable portion of the URL associated with a particular portion of the application and the set of state information identifying the first state comprising one or more parameters associated with the URL.

3. The computer program product of claim 2, wherein the one or more parameters associated with the URL are embedded within the URL as parameters.

4. The computer program product of claim 2, wherein the one or more parameters comprise a portion of a hypertext transfer protocol (HTTP) request sent with the URL.

5. The computer program product of claim 1, wherein the dynamically transparent selection is performed by algorithms optimizing system resources.

6. The computer program product of claim 1, wherein the dynamically transparent selection further comprises a determination of at least one of the following:

the available main memory associated with storage of state information at the server;

the number of clients sending requests to the application within a specified period;

whether each component of the application is enabled to execute statelessly; or the available processing resources available to the application upon receiving the request.

7. The computer program product of claim 1, wherein the response comprises a URL associated with the application, the set of updated state information identifying the second state of the application comprising one or more parameters associated with the URL.

8. The computer program product of claim 1, wherein the request comprises a first request, the response comprises a first response, the client comprises a first client, the instructions comprise a first set of instructions, and the response comprises a first response, further operable when executed to:

receive a second request associated with the application, the second request received from a second client associated with the application and identifying at least one operation to be performed by the application, the second request storing a set of state information identifying the second state for the application to be initialized prior to executing the operations;

determine if a first of the one or more operations of the second request is to be executed, the determination comprising a dynamically transparent selection between a stateless mode and a stateful mode based on, at least in part, runtime environment metrics concurrent with the requested execution of the one or more operations, a specific user behavior, speed of a network connection, processor resources, and type of a network;

in response to the first operation of the second request being executed in a stateless mode:

retrieve the set of state information from the second request; and initialize the application to the second state identified by the retrieved set of state information;

in response to the first operation of the second request being executed in a stateful mode, set the application to a state identified by the locally-maintained set of stored state information separate from the set of state information included with the received second request;

execute the operations identified in the received second request;

generate a second response to the client associated with the received second request, the second response comprising the results of the operations and a set of updated state information identifying a third state of the application as determined after the execution of the second instructions; and terminate execution of the application and delete any state information regarding the interaction with the second client based on the received second request.

9. The computer program product of claim 8, wherein the operations of the first request are executed by the application in the stateless mode and the operations of the second request are executed by the application in the stateful mode.

10. A computer-implemented method for providing stateful execution of a stateless application, the method steps performed by a processor and comprising:

receiving a request with an application associated with the request, the request received from a client associated with the application and identifying at least one operation to be performed by the application, the request always including a set of state information regardless of the application's capability for stateful execution, the set of state information including the previous state information received or maintained at the client during previous interactions with the application, the previous state information associated with a timeout value used to delete or archive the previous state information after a period of time associated with the timeout value has been exceeded, and the state information used to identify a first state for the application to be initialized prior to executing the at least one operation;

determining, using the application, if a first of the at least one operation of the request is to be executed by the application, the determination comprising a dynamically transparent selection between a stateless mode and a stateful mode based on, at least in part, runtime environment metrics concurrent with the requested execution of the at least one operation, a specific user behavior, speed of a network connection, processor resources, and type of a network;

in response to the transparent selection of the stateless mode:

retrieving the set of state information from the request; and initializing the application to the state identified by the retrieved set of state information;

in response to the transparent selection of the stateful mode, setting the application to a state identified by a locally-maintained set of stored state information separate from the set of state information included with the received request;

executing, using the application and based on the dynamic transparent selection between the stateless mode and the stateful mode, the operations identified in the received request;

generating, using the application and based on the dynamic transparent selection between the stateless mode and the stateful mode, a response to the client associated with the received request, the response comprising the results of the operations and a set of updated state information identifying a second state of the application as determined after the execution of the at least one operation; and terminate execution of the application and deleting any state information regarding the interaction with the client based on the received request.

11. The computer-implemented method of claim 10, wherein the request comprises a uniform resource locator (URL) associated with the application, the instructions identifying at least one operation to be performed by the application comprising a web-addressable portion of the URL associated with a particular portion of the application and the set of state information identifying the first state comprising one or more parameters associated with the URL.

12. The computer-implemented method of claim 11, wherein the one or more parameters associated with the URL are embedded within the URL as parameters.

13. The computer-implemented method of claim 11, wherein the one or more parameters comprise a portion of the hypertext transfer protocol (HTTP) request sent with the URL.

14. The computer-implemented method of claim 10, wherein the dynamically transparent selection is performed by algorithms optimizing system resources.

15. The computer-implemented method of claim 10, wherein the dynamically transparent selection further comprises a determination of at least one of the following:
the available main memory associated with storage of state information at the server;
the number of clients sending requests to the application within a specified period;
whether each component of the application is enabled to execute statelessly; or
the available processing resources available to the application upon receiving the request.

16. The computer-implemented method of claim 10 wherein the response comprises a URL associated with the application, the set of updated state information identifying the second state of the application comprising one or more parameters associated with the URL.

17. The computer-implemented method of claim 10, wherein the request comprises a first request, the response comprises a first response, the client comprises a first client, the instructions comprise a first set of instructions, and the response comprises a first response, further comprising:
receiving a second request associated with the application, the second request received from a second client associated with the application and identifying at least one operation to be performed by the application, the request storing a set of state information identifying the second state for the application to be initialized prior to executing the operations;

determining if a first of the one or more operations of the second request is to be executed, the determination comprising a dynamically transparent selection between a stateless mode and a stateful mode based on, at least in part, runtime environment metrics concurrent with the requested execution of the one or more operations, a specific user behavior, speed of a network connection, processor resources, and type of a network;

in response to the first operation of the second request being executed in a stateless mode:
retrieving the set of state information from the second request; and
initializing the application to the second state identified by the retrieved set of state information;

in response to the first operation of the second request being executed in a stateful mode, setting the application to a state identified by the locally-maintained set of stored state information separate from the set of state information included with the received second request;

executing the operations identified in the received second request;

generating a second response to the second client associated with the received second request, the second response comprising the results of the execution of the second instructions and a set of updated state information identifying a third state of the application as determined after the execution of the second instructions; and terminating execution of the application and deleting any state information regarding the interaction with the second client based on the received second request.

18. The computer-implemented method of claim 17, wherein the operations of the first request are executed by the application in a stateless mode and the operations of the second request are executed by the application in a stateful mode.

19. A computer-implemented system, comprising:
a computer memory; and
a hardware processor interoperably coupled with the computer memory and configured to perform operations comprising:
receiving a request with an application associated with the request, the request received from a client associated with the application and identifying at least one operation to be performed by the application, the request always including a set of state information regardless of the application's capability for stateful execution, the set of state information including the previous state information received or maintained at the client during previous interactions with the application, the previous state information associated with a timeout value used to delete or archive the previous state information after a period of time associated with the timeout value has been exceeded, and the state information used to identify a first state for the application to be initialized prior to executing the at least one operation;

determining, using the application, if a first of the at least one operation of the request is to be executed by the application, the determination comprising a dynamically transparent selection between a stateless mode and a stateful mode based on, at least in part, runtime environment metrics concurrent with the requested execution of the at least one operation, a specific user behavior, speed of a network connection, processor resources, and type of a network;
in response to the transparent selection of the stateless mode:
  retrieving the set of state information from the request; and
  initializing the application to the state identified by the retrieved set of state information;
in response to the transparent selection of the stateful mode, setting the application to a state identified by a locally-maintained set of stored state information separate from the set of state information included with the received request;
executing, using the application and based on the dynamic transparent selection between the stateless mode and the stateful mode, the operations identified in the received request;
generating, using the application and based on the dynamic transparent selection between the stateless mode and the stateful mode, a response to the client associated with the received request, the response comprising the results of the operations and a set of updated state information identifying a second state of the application as determined after the execution of the at least one operation; and
terminate execution of the application and deleting any state information regarding the interaction with the client based on the received request.

* * * * *